(12) United States Patent
Nishizaki

(10) Patent No.: US 10,289,366 B2
(45) Date of Patent: May 14, 2019

(54) IMAGE EDITOR, AND METHOD AND COMPUTER-READABLE MEDIUM THEREFOR

(71) Applicant: Brother Kogyo Kabushiki Kaisha, Nagoya-shi, Aichi-ken (JP)

(72) Inventor: Takashi Nishizaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/450,096

(22) Filed: Mar. 6, 2017

(65) Prior Publication Data
US 2017/0262239 A1 Sep. 14, 2017

(30) Foreign Application Priority Data
Mar. 11, 2016 (JP) ................. 2016-047691

(51) Int. Cl.
G06F 15/00 (2006.01)
G06F 3/12 (2006.01)
G06F 17/21 (2006.01)

(52) U.S. Cl.
CPC .......... *G06F 3/1256* (2013.01); *G06F 3/1204* (2013.01); *G06F 3/1208* (2013.01); *G06F 3/1243* (2013.01); *G06F 3/1251* (2013.01); *G06F 3/1292* (2013.01); *G06F 17/212* (2013.01)

(58) Field of Classification Search
CPC .... G06F 3/1256; G06F 3/1204; G06F 3/1208; G06F 3/1243; G06F 3/1251; G06F 3/1292; G06F 17/212
USPC ....................................................... 358/1.15
See application file for complete search history.

(56) References Cited

U.S. PATENT DOCUMENTS

| 2008/0134021 A1* | 6/2008 | Yamakado ............. G06F 17/24 715/247 |
| 2013/0002721 A1* | 1/2013 | Hirabayashi .......... G06F 17/212 345/660 |
| 2013/0016397 A1* | 1/2013 | Hoshikawa ........... G06F 3/1204 358/1.15 |

FOREIGN PATENT DOCUMENTS

| JP | H06-282605 A | 10/1994 |
| JP | 2002-142092 A | 5/2002 |
| JP | 2012-153046 A | 8/2012 |
| JP | 2013-037393 A | 2/2013 |
| JP | 2014-186455 A | 10/2014 |
| JP | 2015-027770 A | 2/2015 |

OTHER PUBLICATIONS

Sep. 25, 2008—(JP) Notification of Reasons for Rejection—App 2016-047691.
Feb. 19, 2019—(JP) Decision of Rejection—App 2016-047691.

\* cited by examiner

*Primary Examiner* — Mark R Milia
(74) *Attorney, Agent, or Firm* — Banner & Witcoff, Ltd.

(57) ABSTRACT

An image editor includes a controller configured to display an image editable area on a display, the image editable area including a plurality of sections, each section including one or more objects displayed therein, each object including one of a character and an image, and perform an image edit process for each of the plurality of sections, the image edit process including placing an object in a specified one of the plurality of sections, setting a display attribute of the object, for the specified section, and displaying the object within the specified section in accordance with the display attribute set for the specified section.

19 Claims, 16 Drawing Sheets

IMAGE EDITOR, AND METHOD AND COMPUTER-READABLE MEDIUM THEREFOR

CROSS-REFERENCE TO RELATED APPLICATION

This application claims priority under 35 U.S.C. § 119 from Japanese Patent Application No. 2016-047691 filed on Mar. 11, 2016. The entire subject matter of the application is incorporated herein by reference.

BACKGROUND

Technical Field

The following description relates to one or more aspects of an image editor configured to edit a label image representing contents to be printed on a label.

Related Art

Heretofore, an image editor has been known that is configured to edit a label image representing contents to be printed on a label. For example, a layout editing device has been known that is configured to allow a user to edit a label image by operating a touch panel of a mobile terminal. Specifically, in setting a layout of each object having one or more characters within the label image, the user is allowed to edit the label image by freely setting the layout (e.g., a display size of the characters, an alignment of each object relative to the label image, and a method for fitting the characters in the label image).

In the known image editor, when a plurality of objects are horizontally arranged in line within the label image, it is possible to automatically adjust the alignment (e.g., centering, left-aligned, and right-aligned) of each object in the horizontal direction while maintaining the arrangement order of the objects in the horizontal direction. Further, when a plurality of objects are vertically arranged in line within the label image, it is possible to automatically adjust the alignment (e.g., centering, upper-aligned, and lower-aligned) of each object in the vertical direction while maintaining the arrangement order of the objects in the vertical direction.

SUMMARY

However, in the known image editor, when a plurality of objects are dispersedly placed in the horizontal direction and the vertical direction, the positional relationship among the objects is complicated. In this case, when the alignment of each object is automatically adjusted in at least one of the horizontal direction and the vertical direction, each object might be placed with an unpredictable layout. Meanwhile, when the user freely places each object with an intended layout without using the automatic alignment adjustment function, a heavy burden might be imposed on the user who operates the mobile terminal.

Aspects of the present disclosure are advantageous to provide one or more improved techniques, for an image editor, which make it possible to place a plurality of objects with an appropriate layout while preventing a heavy burden from being imposed on a user.

According to aspects of the present disclosure, an image editor is provided that includes a display, and a controller configured to display an image editable area on the display, the image editable area including a plurality of sections, each section including one or more objects displayed therein, each object including one of a character and an image, and perform an image edit process for each of the plurality of sections. The image edit process includes placing an object in a specified one of the plurality of sections, setting a display attribute of the object, for the specified section, and displaying the object within the specified section in accordance with the display attribute set for the specified section.

According to aspects of the present disclosure, further provided is a method implementable on a processor coupled with a display. The method includes displaying an image editable area on the display, the image editable area including a plurality of sections, each section including one or more objects displayed therein, each object including one of a character and an image, and performing an image edit process for each of the plurality of sections. The image edit process includes placing an object in a specified one of the plurality of sections, setting a display attribute of the object, for the specified section, and displaying the object within the specified section in accordance with the display attribute set for the specified section.

According to aspects of the present disclosure, further provided is a non-transitory computer-readable medium storing computer-readable instructions that are executable by a processor coupled with a display. The instructions are configured to, when executed by the processor, cause the processor to display an image editable area on the display, the image editable area including a plurality of sections, each section including one or more objects displayed therein, each object including one of a character and an image, and perform an image edit process for each of the plurality of sections. The image edit process includes placing an object in a specified one of the plurality of sections, setting a display attribute of the object, for the specified section, and displaying the object within the specified section in accordance with the display attribute set for the specified section.

BRIEF DESCRIPTION OF THE ACCOMPANYING DRAWINGS

FIG. 1 schematically shows a configuration of a printing system in an illustrative embodiment according to one or more aspects of the present disclosure.

Figure 4A:
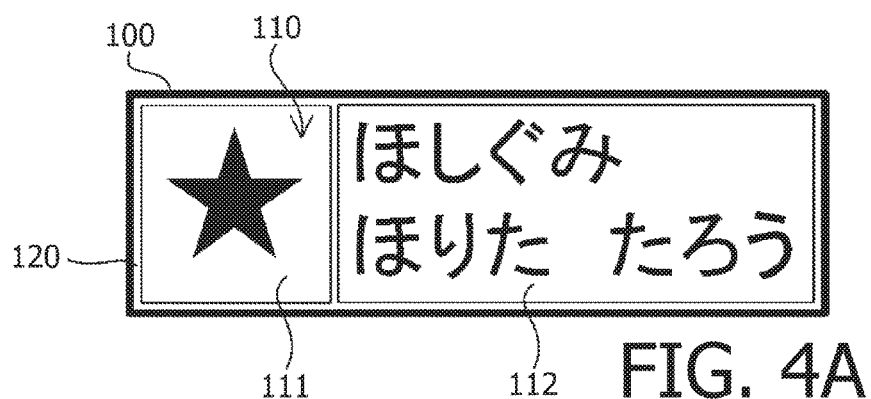
Figure 4B:
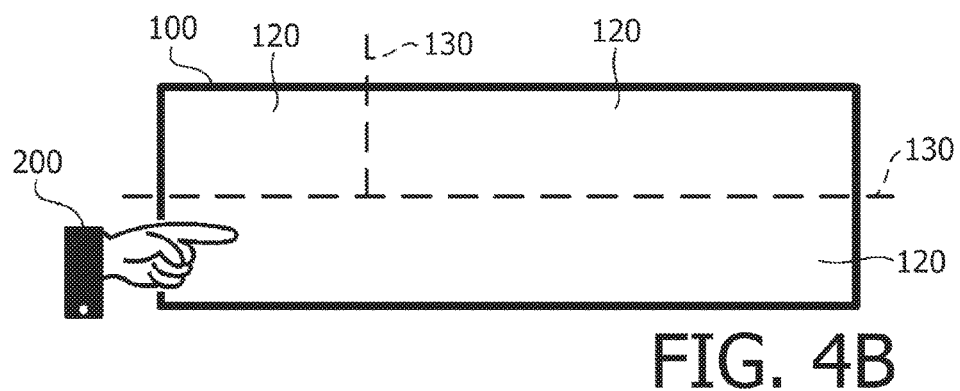

FIGS. 4A and 4B exemplify a label image in the illustrative embodiment according to one or more aspects of the present disclosure.

Figure 5:
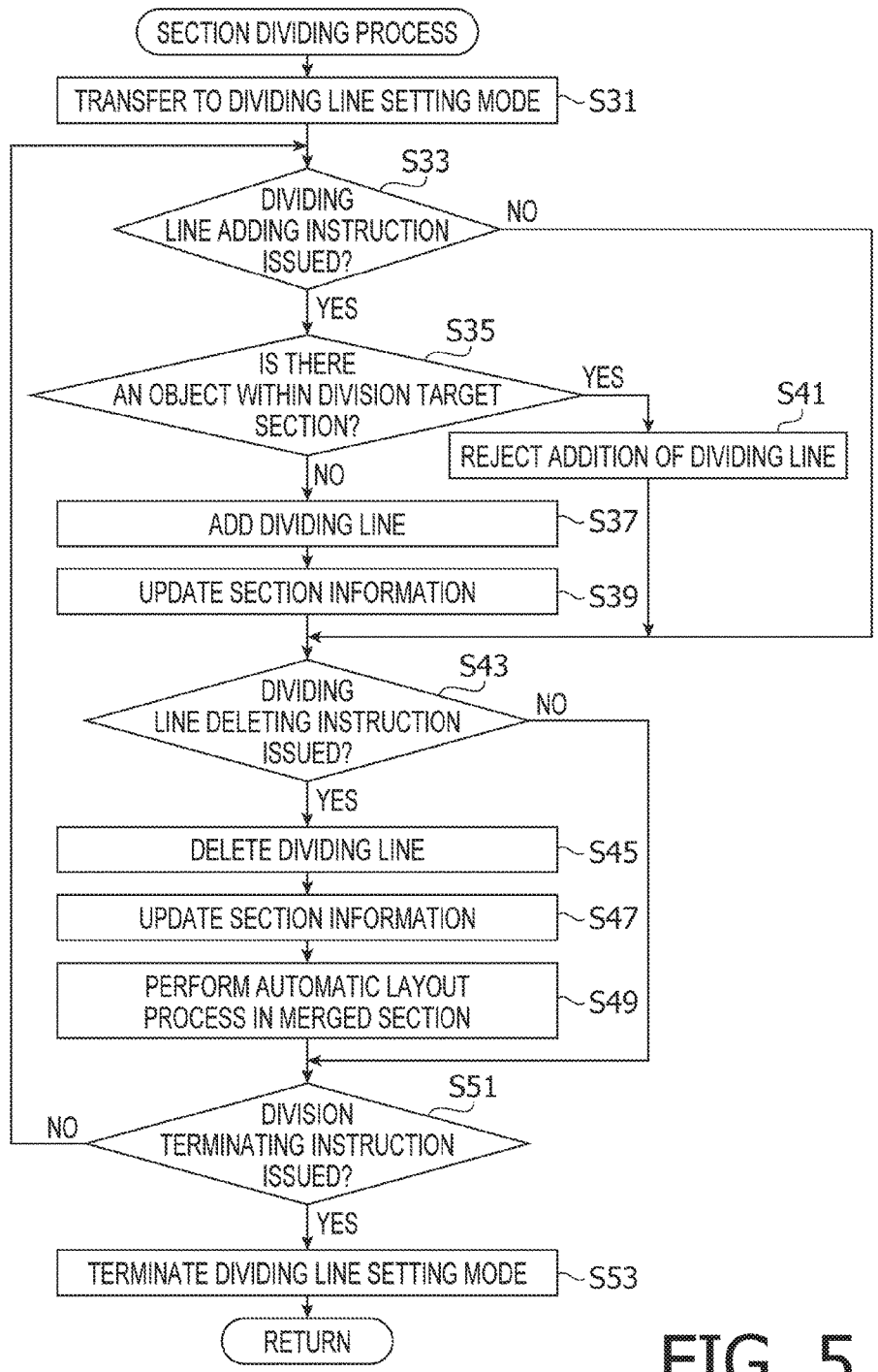

FIG. 5 is a flowchart showing a procedure of a section dividing process in the illustrative embodiment according to one or more aspects of the present disclosure.

Figure 6:
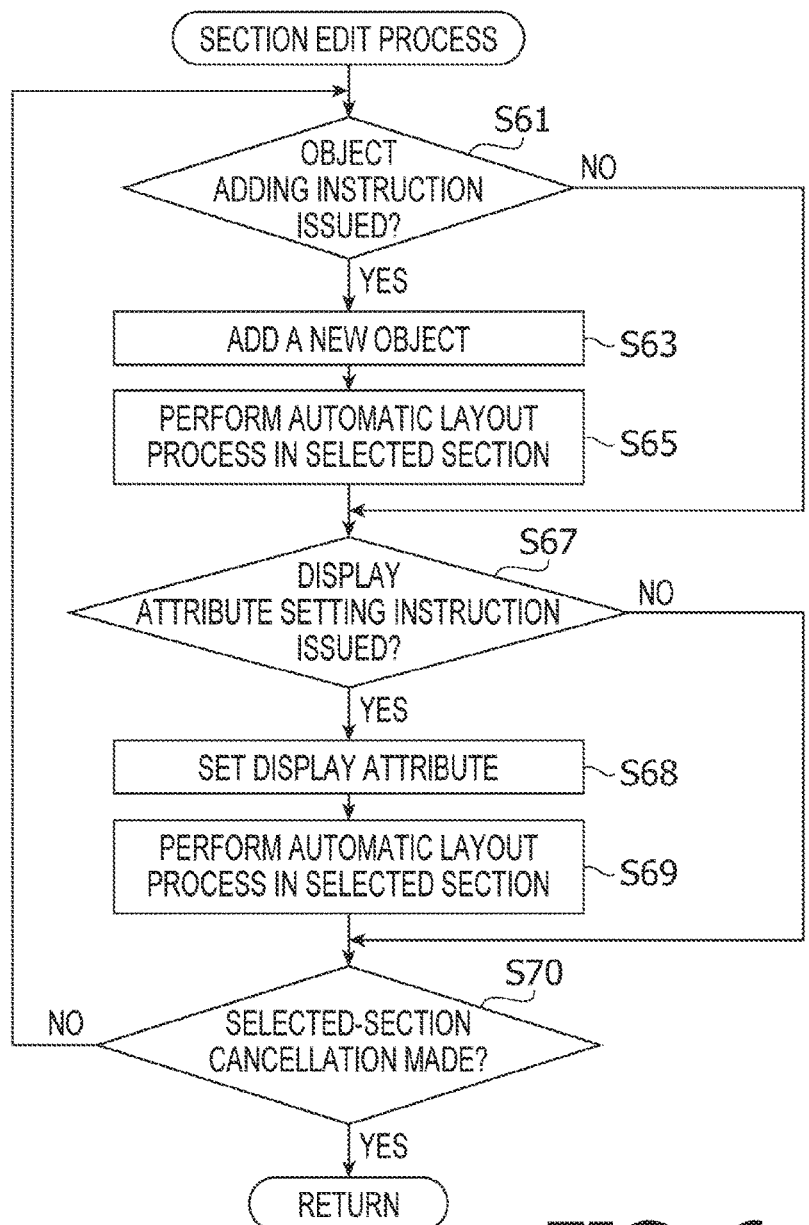

FIG. 6 is a flowchart showing a procedure of a section edit process in the illustrative embodiment according to one or more aspects of the present disclosure.

Figure 7:
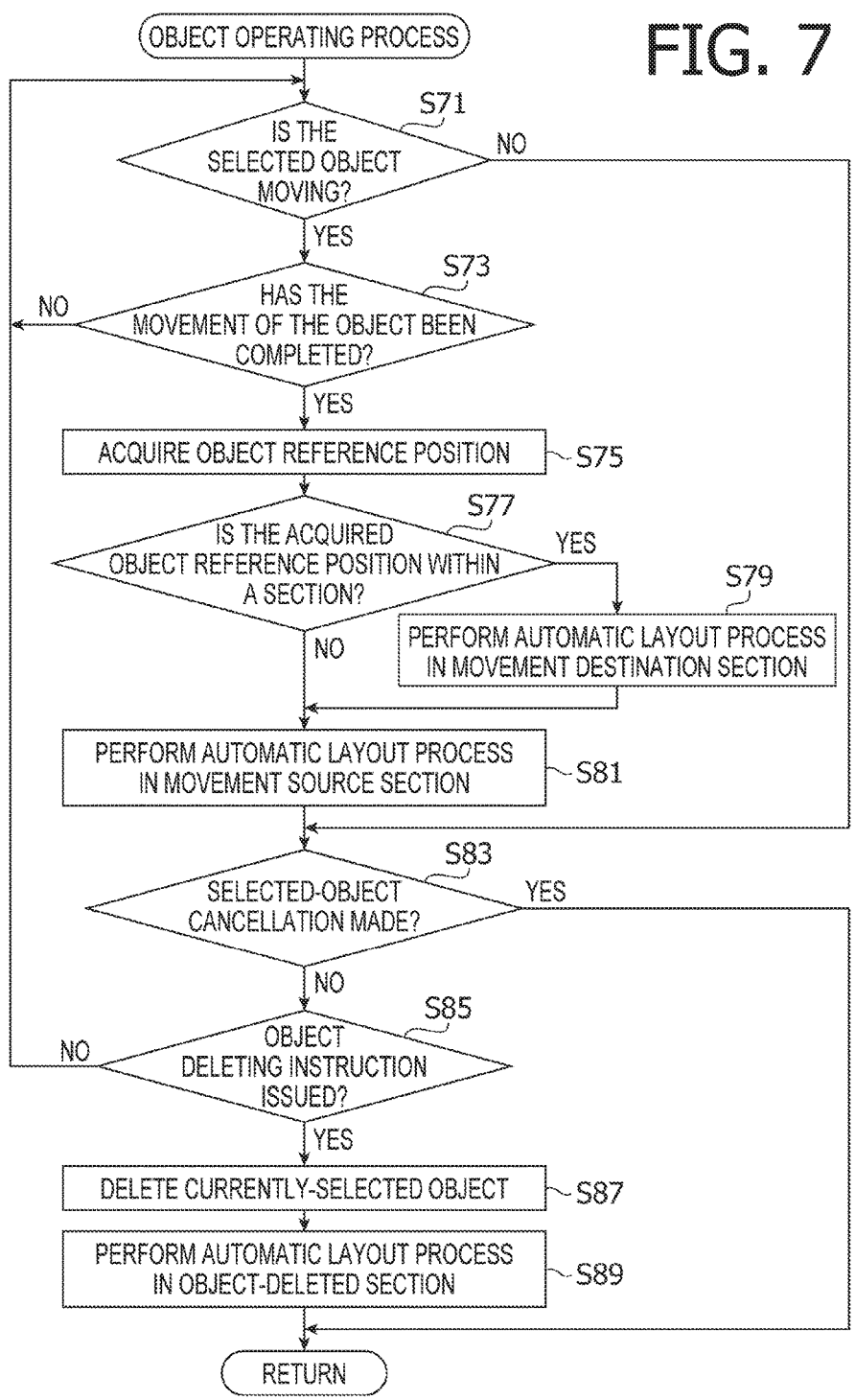

FIG. 7 is a flowchart showing a procedure of an object operating process in the illustrative embodiment according to one or more aspects of the present disclosure.

Figure 8:
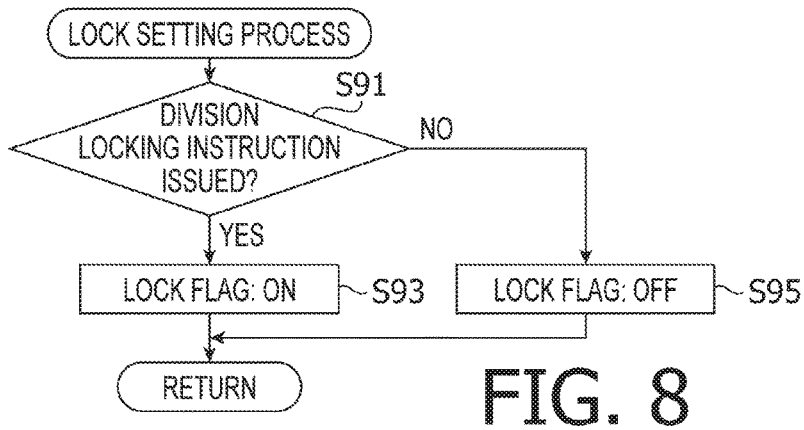

FIG. 8 is a flowchart showing a procedure of a lock setting process in the illustrative embodiment according to one or more aspects of the present disclosure.

Figure 9:
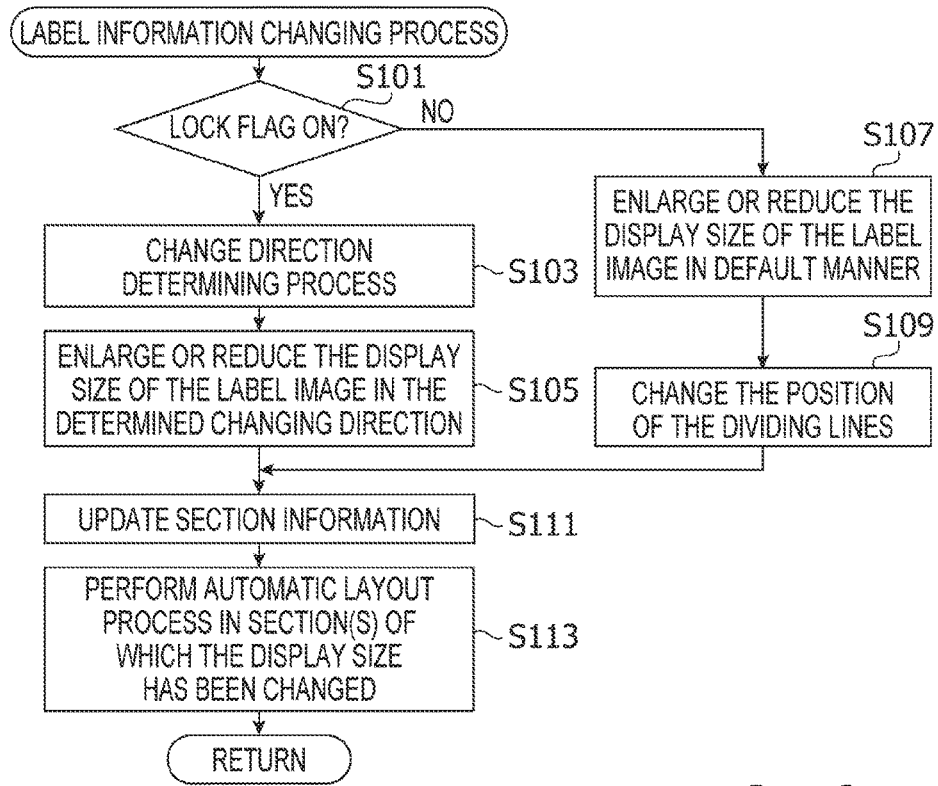

FIG. 9 is a flowchart showing a procedure of a label information changing process in the illustrative embodiment according to one or more aspects of the present disclosure.

Figure 10A:
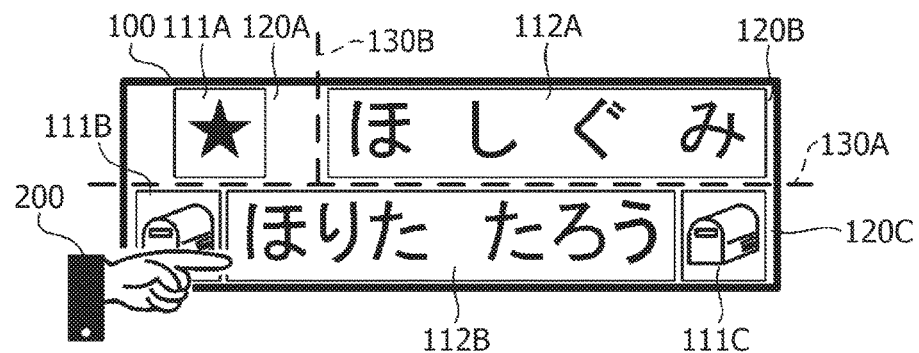
Figure 10B:
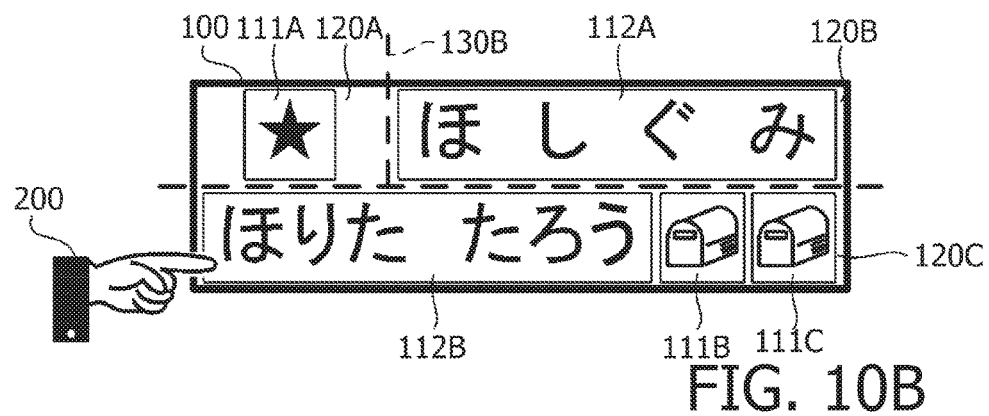
Figure 10C:
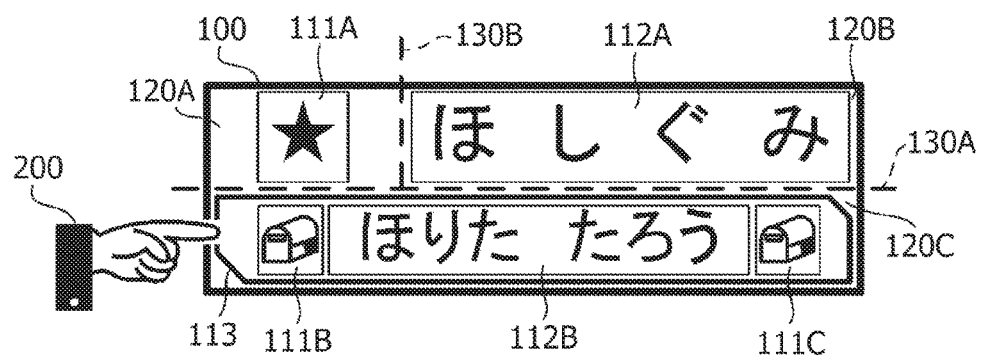

FIGS. 10A to 10C exemplify a process of editing the label image in the illustrative embodiment according to one or more aspects of the present disclosure.

Figure 11A:
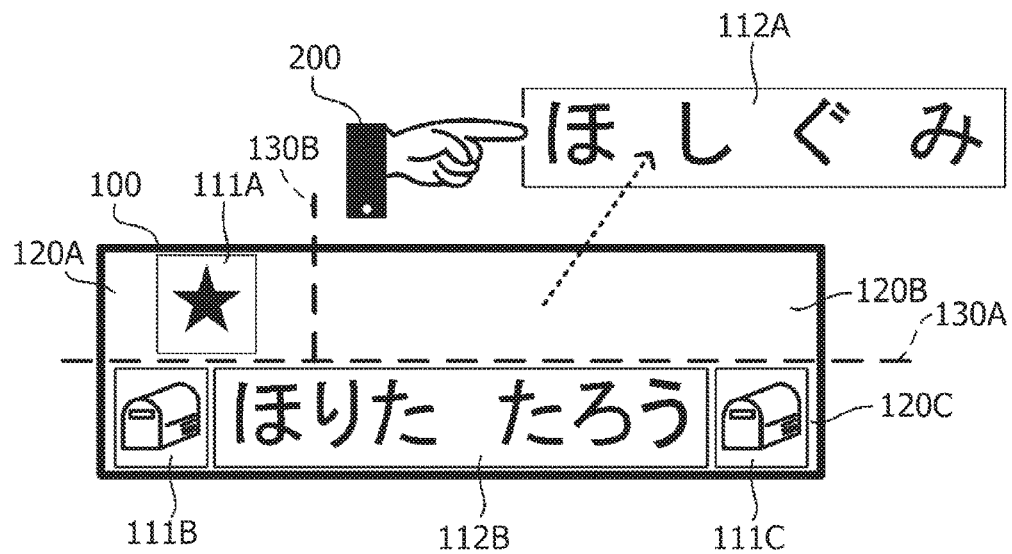
Figure 11B:
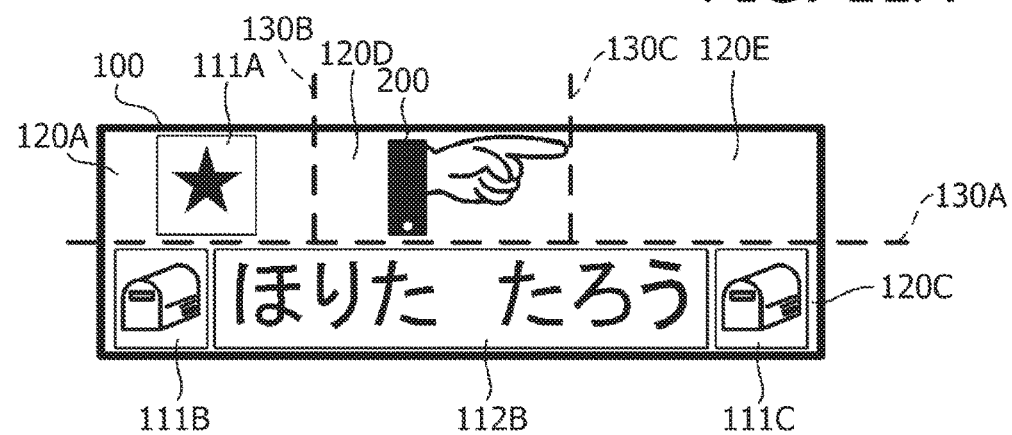
Figure 11C:
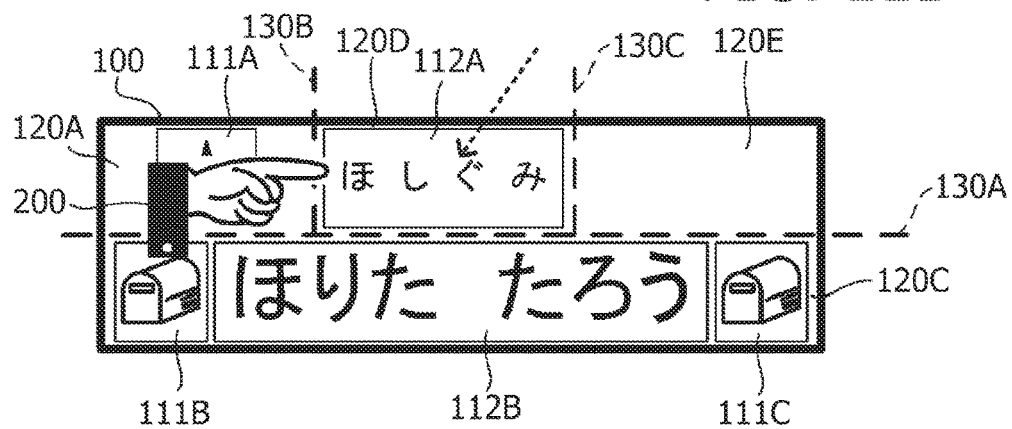

FIGS. 11A to 11C exemplify a process of editing the label image in the illustrative embodiment according to one or more aspects of the present disclosure.

Figure 12A:
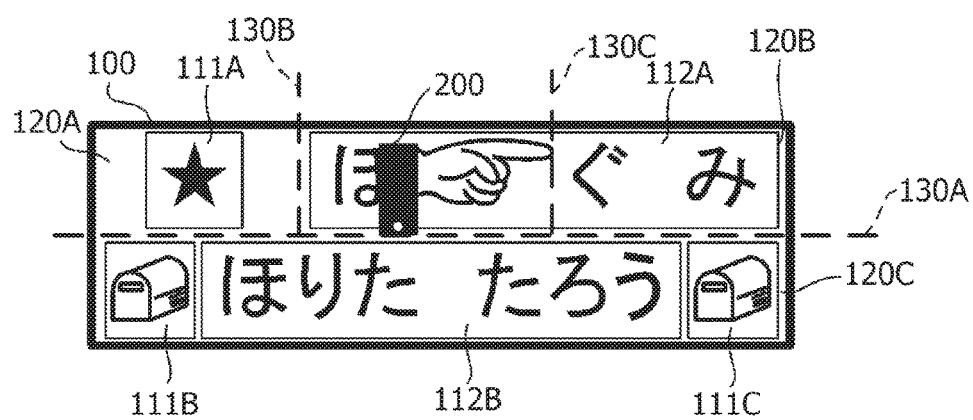
Figure 12B:
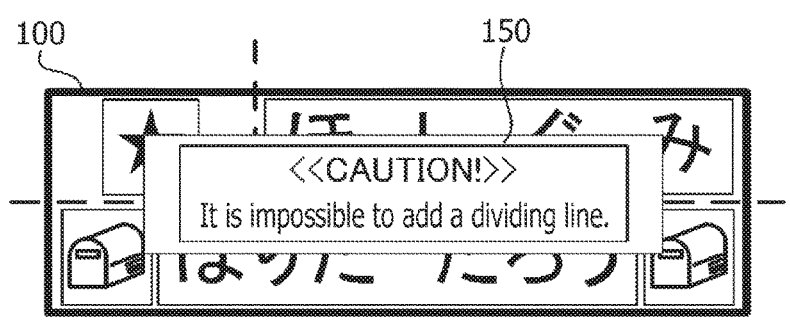

FIGS. 12A to 12B exemplify a process of editing the label image in the illustrative embodiment according to one or more aspects of the present disclosure.

Figure 13A:
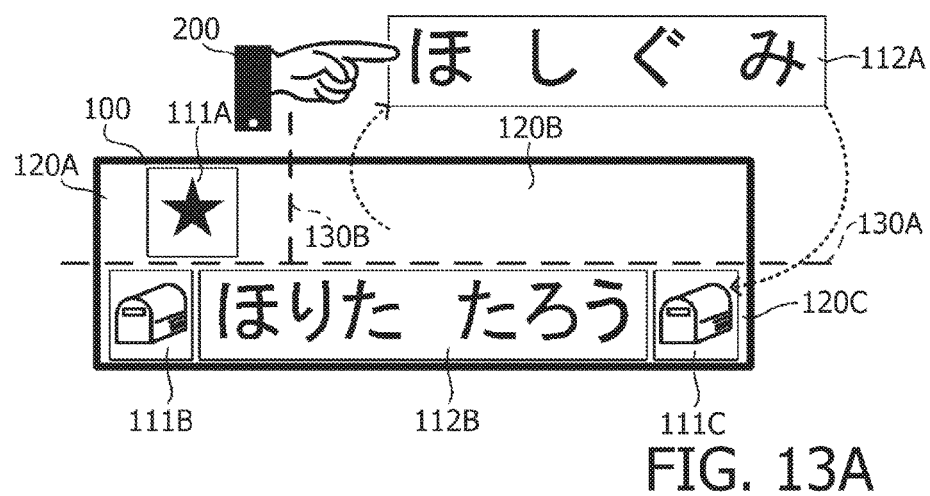
Figure 13B:
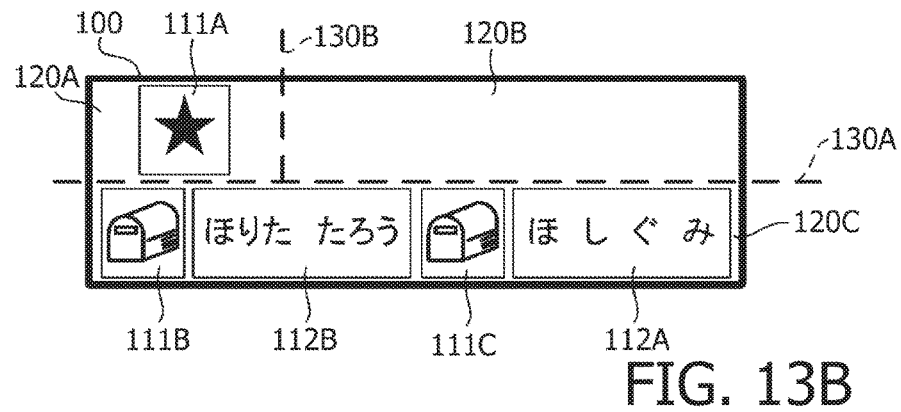

FIGS. 13A to 13B exemplify a process of editing the label image in the illustrative embodiment according to one or more aspects of the present disclosure.

Figure 14A:
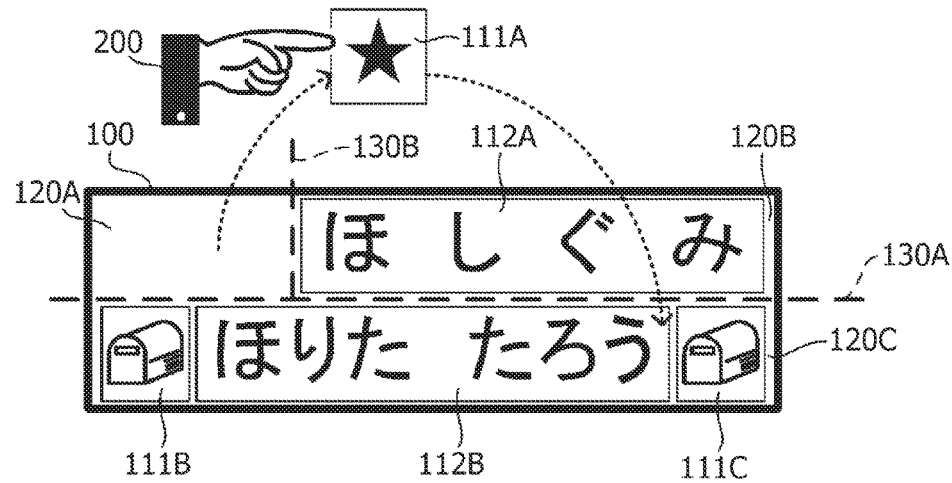
Figure 14B:
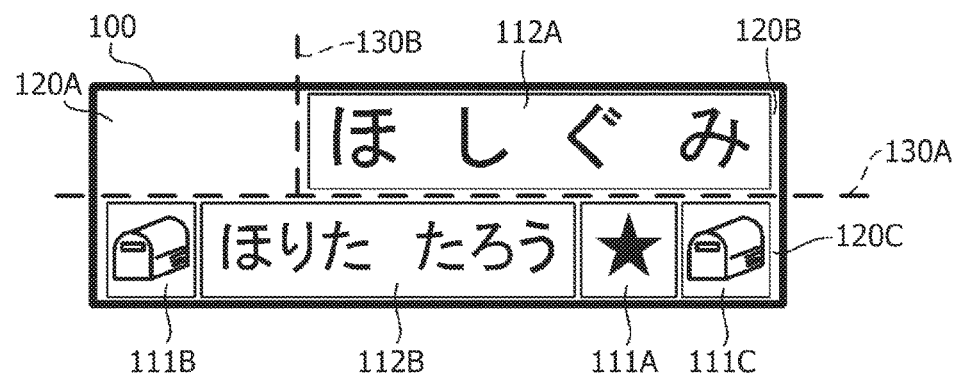

FIGS. 14A to 14B exemplify a process of editing the label image in the illustrative embodiment according to one or more aspects of the present disclosure.

Figure 15A:
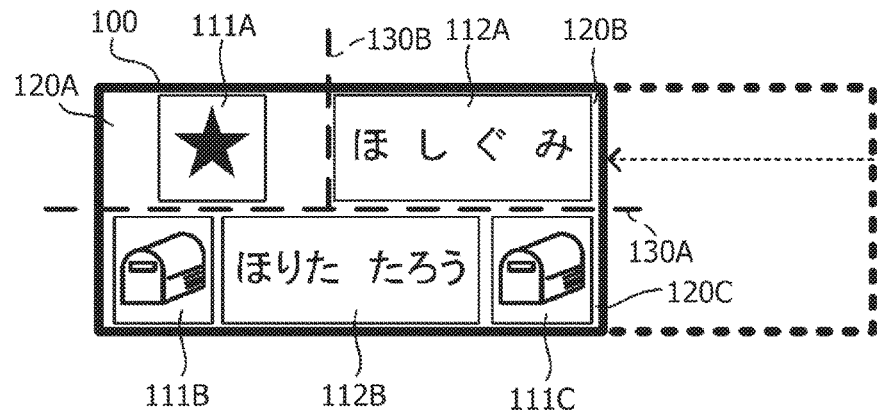
Figure 15B:
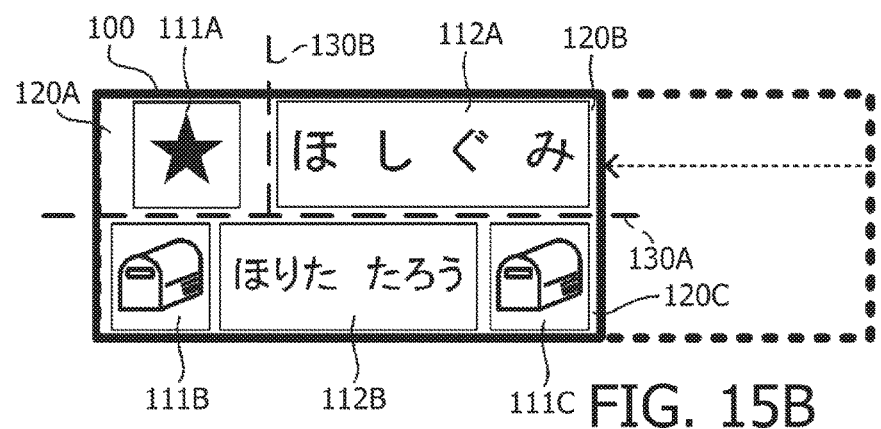

FIGS. 15A to 15B exemplify a process of editing the label image in the illustrative embodiment according to one or more aspects of the present disclosure.

Figure 16:
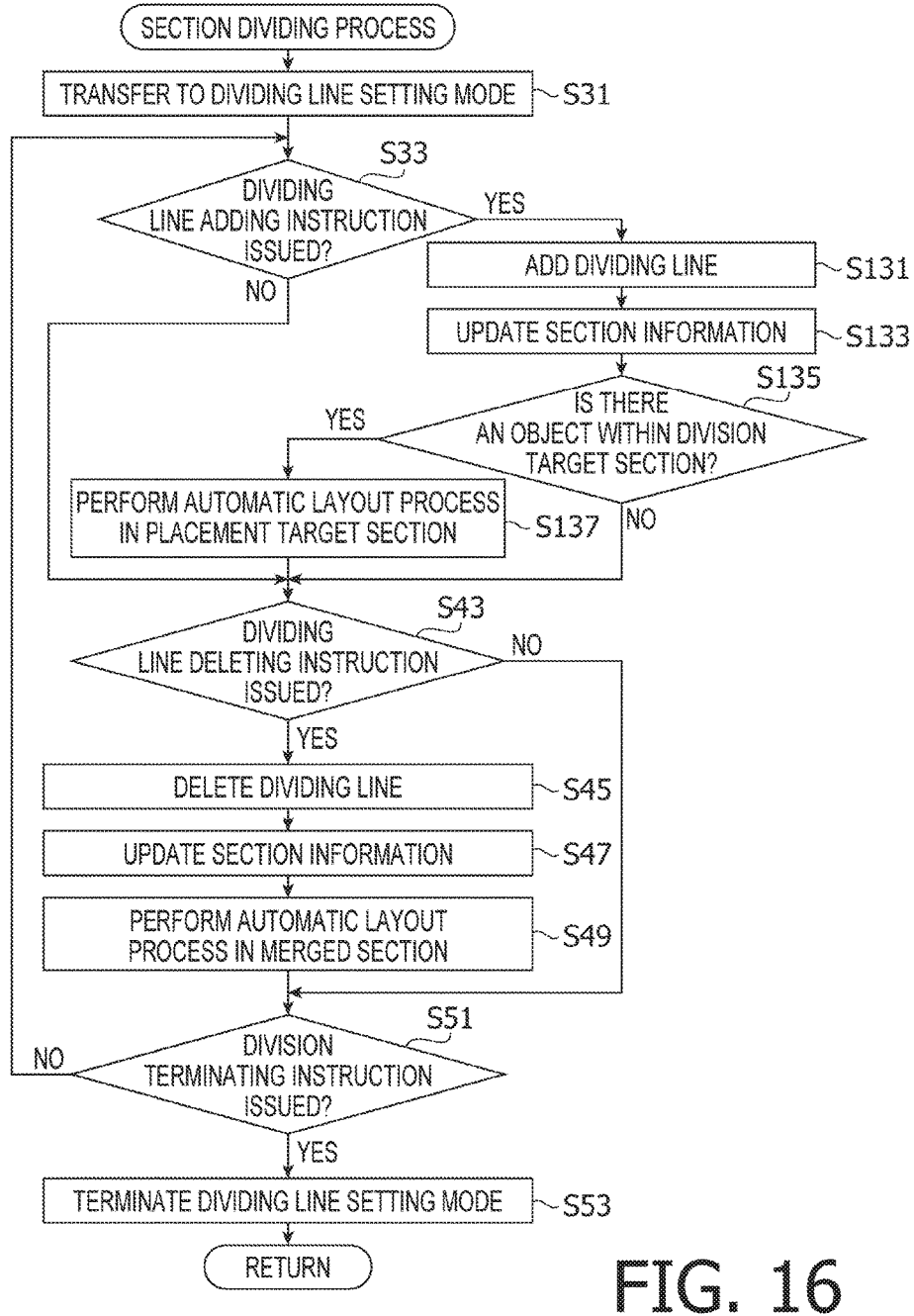

FIG. 16 is a flowchart showing a procedure of a section dividing process in a modification according to one or more aspects of the present disclosure.

Figure 17A:
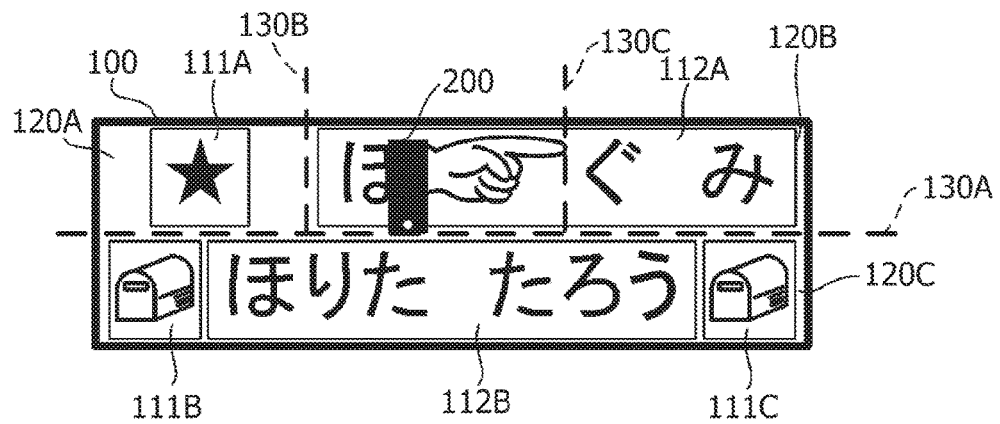
Figure 17B:
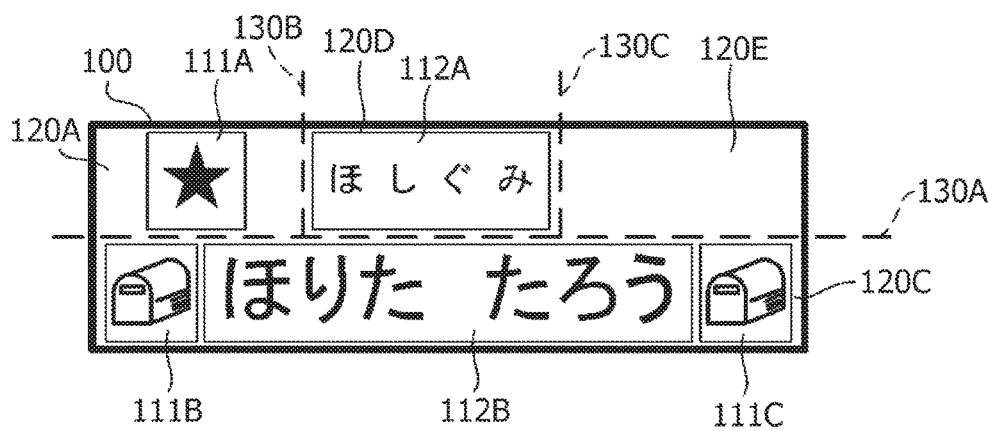

FIGS. 17A to 17B exemplify a process of editing the label image in the modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
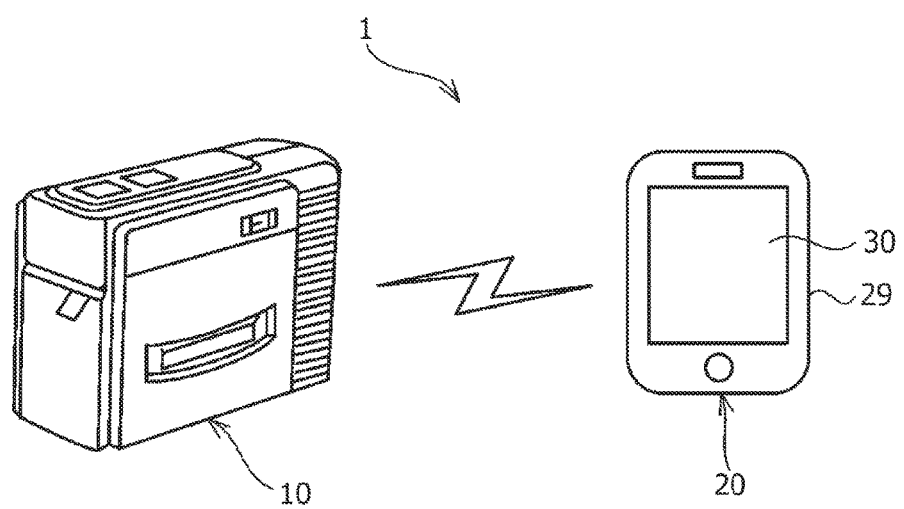

A printing system 1 will be overviewed with reference to FIG. 1. The printing system 1 includes a printer 10 and a mobile terminal 20 that are interconnected via wired or wireless communication. In an example shown in FIG. 1, the printer 10 and the mobile terminal 20 are interconnected via wireless communication. The printer 10 is a small label printer configured to produce an attachable label by printing characters (e.g., letters, symbols, and figures) on a tape as a long print medium. The mobile terminal 20 is a small computer terminal (e.g., a smartphone) usable for editing a label image representing contents to be printed on the label.

When a user edits the label image, the mobile terminal 20 generates print data for printing the label image, and transmits the generated print data to the printer 10. The printer 10 performs a printing operation based on the print data received from the mobile terminal 20. Thereby, the label is produced. Thus, the user is allowed to produce the label with the printer 10 by operating the mobile terminal 20.

Figure 2:
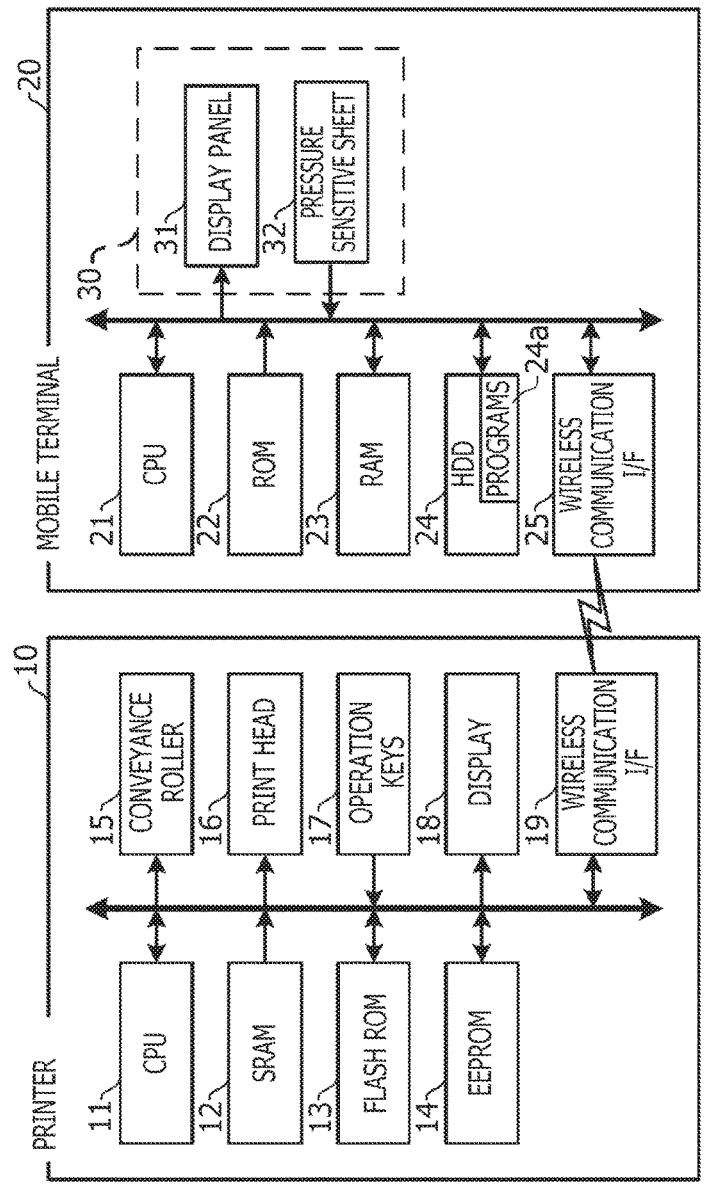
FIG. 2 is a block diagram schematically showing an electrical configuration of the printing system in the illustrative embodiment according to one or more aspects of the present disclosure.

Referring to FIG. 2, an electrical configuration of the printing system 1 will be described. The printer 10 includes a CPU 11 configured to take overall control of the printer 10. The CPU 11 is electrically connected with an SRAM 12, a FLASH ROM 13, an EEPROM 14, a conveyance roller 15, a print head 16, operation keys 17, a display 18, a wireless communication interface (hereinafter referred to as a "wireless communication I/F") 19, and a wired connection I/F (not shown).

The SRAM 12 is configured to store a timer, a counter, and temporary data. The FLASH ROM 13 is configured to store control programs for the CPU 11, a BIOS, and an OS. The EEPROM 14 is configured to store parameters and initial setting information. The conveyance roller 15 is configured to convey a tape contained in a tape cassette (not shown) attached to the printer 10. The print head 16 is configured to perform a printing operation on the tape conveyed by the conveyance roller 15. The wireless communication I/F 19 includes a controller for performing wireless communication with external devices such as the mobile terminal 20. The wired connection I/F (not shown) is an interface configured to establish a wired connection with external devices such as the mobile terminal 20.

The mobile terminal 20 is electrically connected with a CPU 21, a ROM 22, a RAM 23, an HDD 24, a wireless communication I/F 25, a wired connection I/F (not shown), and a touch panel 30. The ROM 22 is configured to store a boot program and a BIOS. The RAM 23 is configured to store a timer, a counter, and temporary data. The HDD 24 is configured to store various kinds of application programs 24a and an OS. For instance, the application programs 24a stored in the HDD 24 include an application program (hereinafter referred to as an "image edit application") for executing a below-mentioned image edit process (see FIG. 3) and below-mentioned objects usable by the image edit application. It is noted that the application programs 24a, including the image edit application, and the objects may be stored in the ROM 22. In this case, the mobile terminal 20 may not necessarily include the HDD 24. The wireless communication I/F 25 includes a controller for performing wireless communication with external devices such as the printer 10. The wired connection I/F (not shown) is an interface configured to establish a wired connection with external devices such as the printer 10.

The mobile terminal 20 includes a main body 29 (see FIG. 1) that is formed in a rectangular shape in a front view (i.e., when viewed from the front). On a front surface of the main body 29, a touch panel 30 is disposed. The touch panel 30 is configured to detect a contact with an external body. The touch panel 30 has a rectangular display area. The touch panel 30 includes a display panel 31 laminated with a substantially-transparent pressure sensitive sheet 32. The display panel 31 is configured to display an image. The pressure sensitive sheet 32 is configured to detect a contact with an external body. The CPU 21 is configured to specify a user input operation based on a contact position, identified by the pressure sensitive sheet 32, where the user has touched the pressure sensitive sheet 32 with the external body.

In the present example according to in the illustrative embodiment, the mobile terminal 20 has a user interface function that prompts and causes the user to perform input operations on an interactive basis. When the image edit application is launched on the mobile terminal 20, an interactive screen is displayed on the touch panel 30. The interactive screen is configured to allow the user to edit the layout of objects on an interactive basis. Each object is a set of data including a text (e.g., a character string including letters, figures, and symbols) and/or a decorative image. For instance, the user generates a label image to be printed by the printer 10, by performing various operations to the interactive screen on the touch panel 30 and editing the layout of each object included in the label image.

Figure 3:
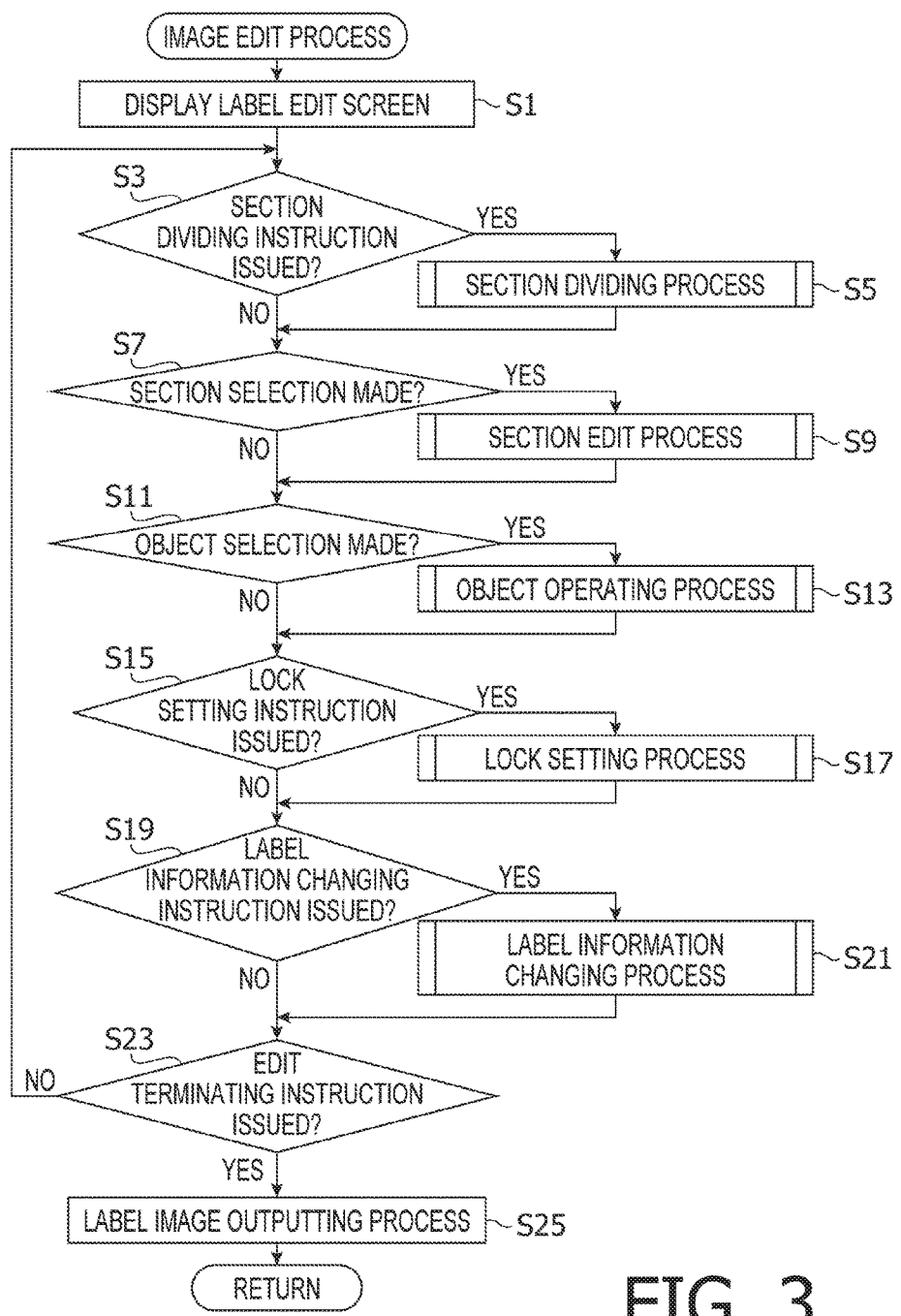
FIG. 3 is a flowchart showing a procedure of an image edit process in the illustrative embodiment according to one or more aspects of the present disclosure.

Referring to FIGS. 3 to 15, an image edit process to be executed by the mobile terminal 20 will be described. When the image edit application is launched on the mobile terminal 20, the image edit process (see FIG. 3) is performed by the CPU 21. As shown in FIG. 3, in the image edit process, the CPU 21 first displays on the touch panel 30 a label edit screen (not shown) that is the interactive screen (S1). In the present example, the label edit screen includes a label image 100 (see FIG. 4) and a command entry field (not shown). The label image 100 is an image area in which the layout of objects (see FIG. 4) is edited. The command entry field is a field to select and execute a command.

For instance, in S1, a label image 100 corresponding to previously-specified label information is displayed with an object 110 being not placed on the label image 100. The label information indicates a shape, a size, and a template of the label image 100. The label image 100 exemplified in FIGS. 4A and 4B corresponds to a rectangular plain template with a label width (i.e., a length in a vertical direction) of 36 mm and a label length (i.e., a length in a left-to-right direction) of 100 mm. The user is allowed to freely change the label information by operating the touch panel. In this case, the label image 100 displayed on the touch panel 30 is updated in accordance with the changed label information.

In the present example, as shown in FIG. 4A, for instance, the user is allowed to edit the layout of objects 110 on the label image 100 and edit each object 110 by operating an icon 200 displayed on the touch panel 30. The objects 110 may include a symbol object 111, a text object 112, and a frame object 113 (see FIG. 10C).

The symbol object 111 includes a decorative image. In the present example, the symbol object 111 is a quadrangular area in which the decorative image is placed. In the present example, the CPU 21 automatically adjusts the display size of the decorative image to be a maximum display size that allows the decorative image to fit within the symbol object 111. Specifically, the CPU 21 enlarges or reduces the decorative image, through a similar conversion, to a maximum size that enables the decorative image to fit within the symbol object 111.

The text object 112 includes a text. In the present example, the text object 112 is a quadrangular area in which the text is placed. In the present example, the CPU 21 automatically adjusts the display size of the text to be a maximum display size that allows the text to fit within the text object 112. Specifically, the CPU 21 enlarges or reduces the text, through a similar conversion, to a maximum size that enables the text to fit within the text object 112.

The frame object 113 is a quadrangular area having a decorative frame configured to have one or more other objects 110 placed therein. In the present example, the CPU 21 automatically adjusts the display size of each of the other objects 110 to be a maximum display size that allows each object 110 to fit within the frame object 113. Specifically, the CPU 21 enlarges or reduces each of the other objects 110, through a similar conversion, to a maximum size that enables each object 110 to fit within the frame object 113.

It is noted that the user may specify a display size of the decorative image placed within the symbol object 111. In this case, when the decorative image in the specified display size fits in the symbol object 111, the CPU 21 may display the decorative image in the specified display size. Meanwhile, when the decorative image in the specified display size does not fit in the symbol object 111, the CPU 21 may reduce the display size of the decorative image such that the decorative image fits in the symbol object 111. The same applies to the text placed in the text object 112 and each of the other objects 110 placed in the frame object 113.

Further, in the present example, as shown in FIG. 4B, for instance, by operating the icon 200, the user may set a dividing line 130 for the label image 100 to divide the label image 100 into a plurality of sections 120. The user may place one or more objects 110 in each section 120, and may edit the layout of the objects 110 in each section 120. In an initial state where the dividing line 130 is not set for the label image 100, the substantially whole label image 100 is treated as a single section 120.

In the present example, it is possible to set, for each of the sections 120, a display attribute for automatically adjusting the layout of the corresponding objects 110. The display attribute set for each section 120 is stored into the RAM 23. The CPU 21 is configured to perform an automatic layout process based on the display attribute set for each section 120. In the automatic layout process, the layout of the corresponding objects 110 placed in each section 120 are automatically adjusted in accordance with the display attribute set for each section 120.

For instance, the display attribute includes an arrangement direction and an alignment of the objects 110 placed in the corresponding section 120. The arrangement direction of the objects 110 is a direction in which the objects 110 are arranged. For instance, the vertical direction (i.e., a label width direction) or the left-to-right direction (i.e., a label length direction) is settable as the arrangement direction. In the present example, when the arrangement direction is the left-to-right direction, a left side in the left-to-right direction is an upstream side, and a right side in the left-to-right direction is a downstream side. Further, when the arrangement direction is the vertical direction, an upper side in the vertical direction is an upstream side, and a lower side in the vertical direction is a downstream side.

The alignment of the objects 110 placed in the corresponding section 120 represents which side of the upstream side, the center side, and the downstream side in the arrangement direction within the section 120, the objects 110 are to be placed on. For instance, when the arrangement direction of the objects 110 is the left-to-right direction, one of "left-aligned," "centering," and "right-aligned" is settable as the alignment of the objects 110. When the arrangement direction of the objects 110 is the vertical direction, one of "upper-aligned," "centering," and "lower-aligned" is settable as the alignment of the objects 110.

When a plurality of objects 110 are arranged in a particular arrangement order within a section 120, the CPU 21 displays the plurality of objects 110 to be arranged in the particular arrangement order within the section 120. At this time, the CPU 21 displays the plurality of objects 110 in accordance with an arrangement direction and alignment specified by the display attribute set for the section 120. In the initial state where the dividing line 130 is not set for the label image 100, a default display attribute is automatically set for the single section 120 representing the substantially whole label image 100. For instance, the default display attribute may include the left-to-right direction as the arrangement direction and "centering" as the alignment.

In the present example, in the automatic layout process, a display size of an object 110 placed in each section 120 is automatically adjusted as follows. When a symbol object 111 is placed in a section 120, the CPU 21 automatically adjusts the display size of the symbol object 111 to be a maximum display size that allows the symbol object 111 to fit within the section 120. Specifically, the CPU 21 enlarges or reduces the symbol object 111, through a similar conversion, to a maximum size that enables the symbol object 111 to fit within the section 120. Along with this, in the symbol object 111, a display size of a decorative image is automatically adjusted in substantially the same manner as described above.

Further, when a text object 112 is placed in a section 120, the CPU 21 automatically adjusts the display size of the text object 112 such that the text object 112 closely fits within the section 120. Specifically, the CPU 21 enlarges or reduces the text object 112 in the label width direction and the label length direction. Along with this, in the text object 112, a display size of a text is automatically adjusted in substantially the same manner as described above.

Further, when a symbol object 111 and a text object are placed in a single section 120, the CPU 21 automatically adjusts the display size of the symbol object 111 within the section 120 as described above. The CPU 21 automatically adjusts the display size of the text object 112 such that the text object 112 closely fits in a remaining area other than the symbol object 111 within the section 120.

The aforementioned automatic layout process may be changed to the following modifications. For instance, when a symbol object 11 and a plurality of text objects 112 are placed in a single section 120, the CPU 21 may evenly allocate a remaining area other than the symbol object 11 within the section 120 to the text objects 112. Alternatively, the CPU 21 may allocate the remaining area to the text objects 112 in accordance with an text amount of each text object 112. Furthermore, when a plurality of objects 110 are placed in a single section 120, the CPU 21 may automatically adjust the display sizes for all the objects 110 with an equal enlargement/reduction ratio such that all the objects 110 fit within the section 120.

Subsequently, as shown in FIG. 3, the CPU 21 determines whether a section dividing instruction has been issued (S3). For instance, when a section dividing instruction has been selected from the command entry field (not shown) and executed by the icon 200, the CPU 21 determines that a section dividing instruction has been issued (S3: Yes), and performs a below-mentioned section dividing process (S5). When determining that a section dividing instruction has not been issued (S3: No), or after executing S5, the CPU 21 determines whether a section selection has been made (S7). For instance, when a particular one of sections is selected by the icon 200, the CPU 21 determines that a section selection has been made (S7: Yes), and performs a below-mentioned section edit process (S9).

When determining that a section selection has not been made (S7: No), or after executing S9, the CPU 21 determines whether an object selection has been made (S11). For instance, when a particular one of objects 110 is selected by the icon 200, the CPU 21 determines that an object selection has been made (S11: Yes), and performs a below-mentioned object operating process (S13). When determining that an object selection has not been made (S11: No), or after executing S13, the CPU 21 determines whether a lock setting instruction has been issued (S15). For instance, when a lock setting instruction is selected from the command entry field (not shown) and executed by the icon 200, the CPU 21 determines that a lock setting instruction has been issued (S15: Yes), and performs a below-mentioned lock setting process (S17).

When determining that a lock setting instruction has not been issued (S15: No), or after executing S17, the CPU 21 determines whether a label information changing instruction has been issued (S19). For instance, when a label information changing instruction is selected from the command entry field (not shown) and executed by the icon 200, the CPU 21 determines that a label information changing instruction has been issued (S19: Yes), and performs a below-mentioned label information changing process (S21). In the present example, the label information changing instruction includes at least one of a target label width and a target label length of the label image 100. The target label width and the target label length represent a label width and a label length after the display size of the label image 100 is changed, respectively.

When determining that a label information changing instruction has not been issued (S19: No), or after executing S21, the CPU 21 determines whether an edit terminating instruction has been issued (S23). For instance, when an edit terminating instruction is selected from the command entry field (not shown) and executed by the icon 200, the CPU 21 determines that an edit terminating instruction has been issued (S23: Yes), and performs a label image outputting process (S25). Specifically, the CPU 21 stores, into the HDD 24, label image data representing the label image 100 edited on the label edit screen. After executing S25, the CPU 21 terminates the image edit process (see FIG. 3). Meanwhile, when determining that an edit terminating instruction has not been issued (S23: No), the CPU 21 goes back to S3.

When a print instruction to print the label image 100 under editing is input, the CPU 21 lunches a printer driver (not shown), generates print data based on the label image 100 under editing, and transmits to the printer 10 a print command including the generated print data. Further, when a print instruction to perform printing based on label image data stored in the HDD 24 is input, the CPU 21 lunches the printer driver (not shown), generates print data based on the specified label image data, and transmits to the printer 10 a print command including the generated print data. Thus, the printer 10 prints on a tape the label image 100 based on the received print command, thereby producing an attachable label.

Referring to FIG. 5, the section dividing process (S5) will be described. First, the CPU 21 transfers to a dividing line setting mode (S31). The dividing line setting mode is a mode for setting a dividing line 130 for the label image 100. In the present example, by operating the icon 200, the user is allowed to add a dividing line 130 for the label image 100 and delete a dividing line 130 from the label image 100.

Subsequently, the CPU 21 determines whether a dividing line adding instruction has been issued (S33). For instance, when a new dividing line 130 is placed on the label image 100 in response to the icon 200 being operated, the CPU 21 determines that a dividing line adding instruction has been issued (S33: Yes). In this case, the CPU 21 determines whether there is an object 110 within a division target section (S35). The division target section is a section 120 to be divided by the newly placed dividing line 130 (hereinafter referred to as the target dividing line), among the sections placed within the label image 100.

When determining that there is not an object 110 within the division target section (S35: No), the CPU 21 adds the target dividing line onto the label image 100 (S37). At this time, the CPU 21 divides the division target section into two sections 120, based on the added dividing line 130. The CPU 21 sets, for the newly generated two sections 120, the display attribute set for the division target section. Alternatively, the CPU 21 may set a default display attribute for the newly-generated two sections 120.

The CPU 21 updates section information (S39). The section information is information (e.g., the number of sections 120, and the position and the display size of each section 120) regarding layout of the sections 120 placed within the label image 100, and is stored in the RAM 23. Specifically, the CPU 21 updates the section information based on the addition of the newly generated two sections 120 and the deletion of the division target section.

When determining that there is an object 110 within the division target section (S35: Yes), the CPU 21 rejects addition of the target dividing line (S41). Specifically, the CPU 21 deletes the target dividing line without adding it onto the label image 100. At this time, preferably, the CPU 21 may provide to the user a notification that the target dividing line is not added.

When determining that a dividing line adding instruction has not been issued (S33: No), the CPU 21 goes to S43. After executing S39 or S41 as well, the CPU 21 goes to S43. It is noted that there may be a case where the target dividing line extends across a plurality of sections 120. In this case, the CPU 21 performs S35 to S41 as described above for each of the plurality of sections 120 traversed by the target dividing line.

Subsequently, the CPU 21 determines whether a dividing line deleting instruction has been issued (S43). For instance, when a particular one of existing dividing lines 130 is selected and instructed to be deleted in response to the icon 200 being operated, the CPU 21 determines that a dividing line deleting instruction has been issued (S43: Yes). In this case, the CPU 21 deletes the selected dividing line 130 from the label image 100 (S45). At this time, the CPU 21 merges the two sections 120 separated by the deleted dividing line 130 into a single section 120. Hereinafter, the single section 120 into which the plurality of sections 120 are merged in response to the deletion of the dividing line 130 may be referred to as a "merged section." The CPU 21 sets a default display attribute for the merged section. Alternatively, the CPU 21 may set, for the merged section, a display attribute set for one of the two sections combined into the merged section.

The CPU 21 updates the section information (S47). Specifically, the CPU 21 updates the section information based on the deletion of the two sections 120 combined and the addition of the merged section. Next, the CPU 21 performs the automatic layout process in the merged section (S49). Specifically, when one or more objects 110 are placed in at least one of the two sections 120 combined into the merged section, the CPU 21 automatically adjusts the layout of every object 110 placed in the two sections 120 that have been combined into the merged section, based on the display attribute set for the merged section. Further, the CPU 21 automatically adjusts the display size of each object 110 placed within the merged section. Meanwhile, when there is no object 110 placed in any of the two sections 120 that have been combined into the merged section, the CPU 21 goes to SM without executing S49.

When determining that a dividing line deleting instruction has not been issued (S43: No), the CPU 21 goes to SM. After executing S49 as well, the CPU 21 goes to SM. When deleting a dividing line 130 traversing a plurality of combinations each including a plurality of sections 120 in S45, the CPU 21 executes S47 and S49 for each combination of sections 120 (i.e., for each merged section) traversed by the dividing line 130, substantially in the same manner as described above.

Subsequently, the CPU 21 determines whether a division terminating instruction has been issued (SM). For instance, when a division terminating instruction is selected from the command entry field (not shown) and executed by the icon 200, the CPU 21 determines that a division terminating instruction has been issued (S51: Yes). In this case, the CPU 21 terminates the dividing line setting mode (S53), and then returns to the image edit process (see FIG. 3). Meanwhile, when determining that division terminating instruction has not been issued (S51: No), the CPU 21 goes back to S33.

Referring to FIG. 6, the section edit process (S9) will be described. First, the CPU 21 determines whether an object adding instruction has been issued (S61). For instance, when a new object is placed in the currently-selected section 120 (hereinafter, simply referred to as the "selected section") in response to the icon 200 being operated, the CPU 21 determines that an object adding instruction has been issued (S61: Yes). In this case, the CPU 21 adds the newly placed object 110 into the selected section (S63). Next, the CPU 21 performs the automatic layout process in the selected section (S65). Thereby, after the new object 110 is added into the selected section, the layout of every object 110 placed in the selected section is automatically adjusted based on the display attribute set for the selected section. Further, in the selected section, the display size of each object 110 placed therein is automatically adjusted.

When determining that an object adding instruction has not been issued (S61: No), or after executing S65, the CPU 21 determines whether a display attribute setting instruction has been issued (S67). For instance, when a new display attribute is specified in response to the icon 200 being operated, the CPU 21 determines that a display attribute setting instruction has been issued (S67: Yes). In this case, the CPU 21 changes the display attribute for the selected section stored in the RAM 23 to the new display attribute specified in S67 (S68). Next, in the same manner as executed in S65, the CPU 21 performs the automatic layout process in the selected section (S69). Thereby, in the selected section, the layout of every object 110 placed therein is automatically adjusted based on the newly-set display attribute. Further, in the selected section, the display size of each object 110 placed therein is automatically adjusted.

When determining that a display attribute setting instruction has not been issued (S67: No), or after executing S69, the CPU 21 determines whether a selected-section cancellation has been made (S70). For instance, when the selected section is deselected in response to the icon 200 being operated, the CPU 21 determines that a selected-section cancellation has been made (S70: Yes). In this case, the CPU 21 returns to the image edit process (see FIG. 3). Meanwhile, when determining that a selected-section cancellation has not been made (S70: No), the CPU 21 goes back to S61.

Referring to FIG. 7, the object operating process (S13) will be described. First, the CPU 21 determines whether the selected object is moving (S71). For instance, when the currently-selected object 110 is being moved in response to an operation (e.g., a known drag operation) of the icon 200, the CPU 21 determines that the selected object is moving (S71: Yes). In this case, the CPU 21 determines whether the movement of the selected object has been completed (S73). For instance, when the movement of the currently-selected object 110 is completed in response to an operation (e.g., a known drop operation) of the icon 200, the CPU 21 determines that the movement of the selected object has been completed (S73: Yes). In this case, the CPU 21 acquires an object reference position (S75). The object reference position is coordinate information representing a center position of the object 110 (hereinafter referred to as the "movement-completed object") of which the movement has been completed.

Subsequently, the CPU 21 determines whether the acquired object reference position is within a section 120 (S77). Specifically, when the object reference position is included in one of sections 120, the CPU 21 determines that the object reference position is within a section (S77: Yes). In this case, the CPU 21 performs the automatic layout process in a movement destination section (S79). The movement destination section is a section 120 including the acquired object reference position.

In S79, the movement-completed object is placed in the movement destination section in the following manner. When the object reference position is between center coordinates of two objects 110 adjoining within the movement destination section in the arrangement direction, the CPU 21 places the movement-completed object between the two objects 110. Suppose for instance that the arrangement direction set for the movement destination section is the left-to-right direction and that two objects 110 (a left object and a right object) are placed in the movement destination section. In this case, when the object reference position is located on a right side of the center coordinate of the left object and located on a left side of the center coordinate of the right object, the movement-completed object is inserted between the left object and the right object.

Among objects 110 placed in the movement destination section, an object 110 located on a most upstream side (e.g., on a leftmost side) in the arrangement direction may be referred to as a "most upstream object." When the object reference position is located upstream (e.g., on a left side) of a center coordinate of the most upstream object in the arrangement direction, and located downstream (e.g., on a right side) of an upstream end (e.g., a left end) of the movement destination section in the arrangement direction, the CPU 21 places the movement-completed object in a position upstream of the most upstream object in the arrangement direction.

Among the objects 110 placed in the movement destination section, an object 110 located on a most downstream side (e.g., on a rightmost side) in the arrangement direction may be referred to as a "most downstream object." When the object reference position is located downstream (e.g., on a right side) of a center coordinate of the most downstream object in the arrangement direction, and located downstream (e.g., on a left side) of a downstream end (e.g., a right end) of the movement destination section in the arrangement direction, the CPU 21 places the movement-completed object in a position downstream of the most downstream object in the arrangement direction.

After placing the movement-completed object in the movement destination section in the aforementioned manner, the CPU 21 automatically adjusts the layout of every object placed in the movement destination section, based on the display attribute set for the movement destination section. Further, the CPU 21 automatically adjusts the display size of each object 110 placed in the movement destination section.

When determining that the object reference position is not within a section 120 (S77: No), or after executing S79, the CPU 21 performs the automatic layout process in a movement source section (S81). The movement source section is a section 120 in which the movement-completed object was originally placed before the movement. Thereby, after the movement-completed object is deleted, in the movement destination section, the layout of every object 110 placed therein is automatically adjusted based on the display attribute set for the movement source section. When there is no object 110 placed in the movement source section, or when the movement destination section and the movement source section are the same section 120, the CPU 21 goes to S83 without executing S81.

Subsequently, the CPU 21 determines whether a selected-object cancellation has been made (S83). For instance, when the selected object is deselected in response to the icon 200 being operated, the CPU 21 determines that a selected-object cancellation has been made (S83: Yes). In this case, the CPU 21 returns to the image edit process (see FIG. 3). When determining that a selected-object cancellation has not been made (S83: No), the CPU 21 determines whether an object deleting instruction has been issued (S85). For instance, when the currently-selected object 110 is instructed to be deleted in response to the icon 200 being operated, the CPU 21 determines that an object deleting instruction has been issued (S85: Yes).

In this case, the CPU 21 deletes the currently-selected object 110 from the label image 100 (S87). Further, the CPU 21 performs the automatic layout process in an object-deleted section (S89). The object-deleted section is a section 120 from which the object 110 has been deleted in S87. Thereby, after the selected object 110 is deleted, the layout of every object 110 placed in the object-deleted section is automatically adjusted based on the display attribute set for the object-deleted section. Further, the display size of each object 110 placed in the object-deleted section is automatically adjusted. Afterwards, the CPU 21 returns to the image edit process (see FIG. 3). When there is no object 110 placed in the object-deleted section, the CPU 21 returns to the image edit process (see FIG. 3) without executing S89.

When determining that the movement of the selected object has not been completed (S73: No) or determining that an object deleting instruction has not been issued (S85: No), the CPU 21 goes back to S71. When determining that the selected object is not moving (S71: No), the CPU 21 goes to S83.

Referring to FIG. 8, the lock setting process (S17) will be described. First, the CPU 21 determines whether a division locking instruction has been issued (S91). For instance, when a lock setting instruction, selected and executed, represents "ON," the CPU 21 determines that a division locking instruction has been issued (S91: Yes). In this case, the CPU 21 sets a lock flag to "ON" (S93). The lock flag is stored in the RAM 23. The lock flag is information representing whether to fix the position of the dividing line 130 placed in the label image 100. In an initial state, the lock flag is set to "OFF." For instance, when the lock setting instruction, selected and executed, represents "OFF," the CPU 21 determines that a division locking instruction has not been issued (S91: No). In this case, the CPU 21 sets the lock flag to "OFF" (S95). After executing S93 or S95, the CPU 21 returns to the image edit process (see FIG. 3).

Referring to FIG. 9, the label information changing process (S21) will be described. First, the CPU 21 determines whether the lock flag stored in the RAM 23 is set to "ON" (S101). When determining that the lock flag is set to "ON" (S101: Yes), the CPU 21 performs a change direction determining process (S103). The change direction determining process will be described below.

For instance, the CPU 21 displays on the touch panel 30 an accepting screen (not shown) that prompts the user to select a direction in which the size of the label image 100 is to be changed. When the label information changing instruction includes the target label width, the accepting screen includes a selection field that allows the user to select one of two end portions (i.e., an upper end portion and a lower end portion) of the label width as an origin for enlarging or reducing the label image 100 in the label width direction. Further, when the label information changing instruction includes the target label length, the accepting screen includes a selection field that allows the user to select one of two end portions (i.e., a left end portion and a right end portion) of the label length as an origin for enlarging or reducing the label image 100 in the label length direction.

The user selects, on the accepting screen displayed on the touch panel 30, an origin for enlarging or reducing the label image 100. When the label information changing instruction includes the target label width, the CPU 21 determines a direction (i.e., a changing direction for changing the label width) in which the selected origin is to be moved, such that the display size of the label image 100 becomes equal to the target label width. When the label information changing instruction includes the target label length, the CPU 21 determines a direction (i.e., a changing direction for changing the label length) in which the selected origin is to be moved such that the display size of the label image 100 becomes equal to the target label length.

Subsequently, the CPU 21 enlarges or reduces the display size of the label image 100 being displayed on the touch panel 30, in the determined changing direction (S105). Namely, the CPU 21 moves a contour line of the label image 100 that is positioned on the selected origin, in the changing direction determined in S103, while maintaining a state where the positions of the sections 120 placed in the label image 100 are fixed. Thereby, the display size (at least one of the label width and the label length) of the label image 100 is changed without changing the positions of the sections 120 placed in the label image 100. Further, the display size of at least one of the sections 120 placed in the label image 100 is enlarged or reduced along with the movement of the contour line of the label image 100.

When determining that the lock flag is not set to "ON" (S101: No), the CPU 21 enlarges or reduces the display size of the label image 100 in a default manner (S107). Specifically, the CPU 21 changes the display size of the label image 100 in accordance with the target label width and/or the target label length included in the label information changing instruction. Further, the CPU 21 changes the positions of the dividing lines 130 in accordance with an enlargement/reduction ratio for the label image 100 (S109). Namely, the CPU 21 changes the position of each dividing line 130 in accordance with the enlarged or reduced label image 100, so as to maintain the layout of every dividing line 130 relative to the label image 100 before the enlargement or reduction. Along with the positions of the dividing lines 130 being changed, the display size of each section 120 placed in the label image 100 is changed in accordance with the enlargement/reduction ratio for the label image 100. Accordingly, in the enlarged or reduced label image 100, each section 120 is enlarged or reduced through a similar conversion so as to maintain the layout of every dividing line 130 relative to the label image 100 before the enlargement or reduction.

After executing S105 or S109, the CPU 21 updates the section information of the section(s) 120 of which the display size has been changed (S111). The CPU 21 performs the automatic layout process in the section(s) 120 of which the display size has been changed (S113). Thereby, in the section(s) 120 of which the display size has been changed, the layout of every object 110 placed therein is automatically adjusted based on the display attribute set therefor. Afterwards, the CPU 21 returns to the image edit process (see FIG. 3).

Referring to FIGS. 10 to 15, an explanation will be provided of a specific example of a procedure of editing the label image 100 in accordance with the image edit process (see FIG. 3). In an example shown in FIG. 10A, a label image 100 has the same label information (e.g., the label width and the label length) as that of the label image 100 shown in FIG. 4A. In the example, two dividing lines 130A and 130B are set for the label image 100. The dividing line 130A is a straight line extending across the label image 100 in the left-to-right direction. The dividing line 130A divides the label image 100 into sections in the vertical direction. The dividing line 130B is a straight line vertically extending across an upper section of the label image 100 relative to the dividing line 130A. The dividing line 130B divides the upper section of the label image 100 relative to the dividing line 130A into sections in the left-to-right direction. Consequently, the label image 130 is divided by the dividing lines 130A and 130B into three sections 120A to 120C. For each of the sections 120A to 120C, a default display attribute is set.

The section 120A is placed above the dividing line 130A and on a left side of the dividing line 130B. In the section 120A, a symbol object 111A is placed. The section 120B is placed above the dividing line 130A and on a right side of the dividing line 130B. In the section 120B, a text object 112A is placed. The section 120C is placed below the dividing line 130A. In the section 120C, three objects 110 are arranged in an arrangement direction (in the present example, the left-to-right direction) in an order of a symbol object 111B, a text object 112B, and a symbol object 111C from the left.

(First Specific Example)

In the example shown in FIG. 10A, the user operates the icon 200 to select the text object 112B (S11: Yes, and S13). Further, by a drag-and-drop operation, the user moves the text object 112B to the left within the section 120C (S71: Yes, and S73: Yes). At this time, a center coordinate of the text object 112B is placed on a left side of a center coordinate of the symbol object 111B and on a right side of a left end of the section 120C (S75, and S77: Yes).

Thereby, as shown in FIG. 10B, in the section 120C, the text object 112B is moved to a left side of the symbol object 111B (S79). Namely, in the section 120C, an arrangement order of the existing objects 110 is changed. Thus, the user is allowed to freely change the layout of a plurality of objects 110 within an arbitrary section 120.

(Second Specific Example)

In the example shown in FIG. 10A, the user operates the icon 200 to select the section 120C (S7: Yes, and S9). Further, the user operates the icon 200 to place a frame object 113 in the section 120C (S61: Yes). Thereby, the frame object 112 is added into the section 120C (S63). In the section 120C, the layout of the symbol object 111B, the text object 112B, the symbol object 111C, and the frame object 113 is automatically adjusted (S65).

Thereby, as shown in FIG. 10C, the frame object 113 is placed along an inner edge of the section 120C. The symbol object 111B, the text object 112B, and the symbol object 111C are closely placed with display sizes thereof being reduced, within the frame object 113. Thus, the user is allowed to place one or more arbitrary objects 110 in each section 120. In each section 120, the layout of all objects 110 placed therein including a newly-placed object 110 is automatically adjusted in accordance with the display attribute for each section 120. Therefore, it is possible to reduce a burden imposed on the user who operates the mobile terminal 20.

(Third Specific Example)

In the example shown in FIG. 10A, the user operates the icon 200 to select the text object 112A (S11: Yes, and S13). As shown in FIG. 11A, by a drag-and-drop operation, the user moves the text object 112A from the section 120B to an outside area of the label image 100 (S71: Yes, S73: Yes, S75, and S77: No). Further, the user operates the icon 200 to select and execute a section dividing instruction (S3: Yes, and S5).

Subsequently, as shown in FIG. 11B, the user operates the icon 200 to place a new dividing line 130C in the section 120B that is a blank field (S31, and S33: Yes). Thereby, the dividing line 130C is added onto the label image 100 (S35: No, and S37). The dividing line 130C is a straight line vertically extending across the section 120B. The section 120B is divided by the dividing line 130C into two sections 120D and 120E adjoining in the left-to-right direction. In response to this, the section information is updated (S39).

Further, the user operates the icon 200 to select the text object 112A placed in the outside area of the label image 100 (S11: Yes, and S13). As shown in FIG. 11C, by a drag-and-drop operation, the user moves the text object 112A into the section 120D (S71: Yes, S73: Yes, S75, and S77: Yes). Thereby, in the section 120D, the display size of the text object 112A is automatically adjusted such that the text object 112A fits in the section 120D (S79). Thus, by setting the dividing line 130C for the label image 100, the user is allowed to freely edit the layout of sections 120 placed in the label image 100 and freely place an object 110 in each section 120 placed in the label image 100.

(Fourth Specific Example)

In the example shown in FIG. 10A, the user operates the icon 200 to select and execute a section dividing instruction (S3: Yes, and S5). As shown in FIG. 12A, the user operates the icon 200 to place a new dividing line 130C on the section 120B (S31, and S33: Yes). In this case, since the text object 112A is placed in the section 120B, addition of the dividing line 130C is rejected (S35: Yes, and S41). Specifically, as shown in FIG. 12B, a warning message 150, which represents that addition of the dividing line 130C is rejected, is displayed on the touch panel 30, and the dividing line 130C is deleted. Thereby, it is possible to prevent a section 120 with an object 110 placed therein from being mistakenly divided.

(Fifth Specific Example)

In the example shown in FIG. 10A, the user operates the icon 200 to select the text object 112A (S11: Yes, and S13). As shown in FIG. 13A, by a drag-and-drop operation, the user moves the text object 112A from the section 120B into the section 120C (S71: Yes, and S73: Yes). At this time, a center coordinate of the text object 112A is placed on a right side of a center coordinate of the symbol object 111C and on a left side of a right end of the section 120C (S75, and S77: Yes).

Thereby, as shown in FIG. 13B, in the section 120C, the text object 112A is moved to a right side of the symbol object 111C. Further, the display sizes of the symbol object 111B, the text object 112B, the symbol object 111C, and the text object 112A are automatically adjusted such that the symbol object 111B, the text object 112B, the symbol object 111C, and the text object 112A fit in the section 120C (S79). In the present example, the display sizes of the symbol object 111B, the text object 112B, the symbol object 111C, and the text object 112A are automatically adjusted such that a remaining area of the section 120C other than the symbol objects 111B and 111C is evenly allocated to the text objects 112A and 112B.

Further, in the example shown in FIG. 10A, the user operates the icon 200 to select the symbol object 111A (S11: Yes, and S13). As shown in FIG. 14A, by a drag-and-drop operation, the user moves the symbol object 111A from the section 120A into the section 120C (S71: Yes, and S73: Yes). At this time, a center coordinate of the symbol object 111A is placed on a right side of the center coordinate of the text object 112B and on a left side of the center coordinate of the symbol object 111C (S75, and S77: Yes).

Thereby, as shown in FIG. 14B, in the section 120C, the symbol object 111A is moved between the text object 112B and the symbol object 111C. Further, the display sizes of the symbol object 111B, the text object 112B, the symbol object 111A, and the symbol object 111C are automatically adjusted such that the symbol object 111B, the text object 112B, the symbol object 111A, and the symbol object 111C fit in the section 120C (S79). In the present example, the display sizes of the symbol object 111B, the text object 112B, the symbol object 111A, and the symbol object 111C are automatically adjusted such that a remaining area of the section 120C other than the symbol objects 111A to 111C is allocated to the text object 112B.

Thus, the user is allowed to freely move an object 110 between a plurality of sections 120. Further, after an object 110 has been moved from a movement source section and a movement destination section, the layout of every object 110 is automatically adjusted in each of the movement source section and the movement destination section. Therefore, it is possible to reduce a burden imposed on the user who operates the mobile terminal 20.

(Sixth Specific Example)

In the example shown in FIG. 10A, the user operates the icon 200 to select and execute a label information changing instruction including a target label length "70 mm" (S19: Yes, and S21). When the lock flag is set to "ON," for instance, the user selects a right end portion of the label length as the origin on the accepting screen displayed on the touch panel 30. Thereby, a leftward direction is determined as the changing direction for changing the label length (S103). As shown in FIG. 15A, the right side of the label image 100 is moved leftward by 30 mm, and the label length is reduced to 70 mm (S105). Thereby, a length of each of the sections 120B and 120C in the left-to-right direction is shortened by 30 mm. In each of the sections 120B and 120C, the display size of each object 110 placed therein is automatically adjusted (S113). Thereby, the user is allowed to change the display size of the label image 100 without changing the positions of the dividing lines 130 set for the label image 100.

Meanwhile, when the lock flag is set to "OFF," as shown in FIG. 15B, the CPU 21 changes the display size of the label image 100 in accordance with the target label length "70 mm" (S107). Further, the CPU 21 changes the position of the dividing line 130B in accordance with the enlargement/reduction ratio for the label image 100 (S109). Thereby, the length of each of the sections 120A to 120C in the left-to-right direction is shortened in accordance with the enlargement/reduction ratio for the label image 100. In each of the sections 120A to 120C, the display size of each object 110 placed therein is automatically adjusted (S113). Thereby, the user is allowed to change the display size of the label image 100 without changing the positions of the dividing lines 130 set for the label image 100.

In the image edit process (see FIG. 3), the CPU 21 may perform a section dividing process shown in FIG. 16, instead of the section dividing process shown in FIG. 5. In the following description, an explanation will be provided of differences of the section dividing process shown in FIG. 16 from the section dividing process shown in FIG. 5.

In the section dividing process shown in FIG. 16, when determining that a dividing line adding instruction has been issued (S33: Yes), the CPU 21 adds a target dividing line onto the label image 100 in the same manner as executed in S37 (S131). Subsequently, the CPU 21 updates the section information in the same manner as executed in S39 (S133). Next, the CPU 21 determines whether there is an object 110 within the division target section, in the same manner as executed in S35 (S135). When determining that there is an object 110 within the division target section (S135: Yes), the CPU 21 performs the automatic layout process in a placement target section (S137). The placement target section is one of the two sections 120 newly generated by adding the target dividing line.

Specifically, the CPU 21 selects one of the newly-generated two sections 120 as the placement target section. In the present example, an upstream one of the newly-generated two sections 120 in the label length direction is selected as the placement target section. The CPU 21 adds an object 110 placed in the division target section into the selected displacement target section. Thereafter, the CPU 21 automatically adjusts the layout of every object placed in the placement target section, based on the display attribute set for the placement target section. Further, the CPU 21 automatically adjusts the display size of each object 110 placed in the placement target section. When determining that there is not an object 110 within the division target section (S135: No), or after executing S137, the CPU 21 goes to S43.

(Seventh Specific Example)

An explanation will be provided of a specific example of a procedure of editing the label image 100 in the section dividing process shown in FIG. 16. In the example shown in FIG. 10A, the user operates the icon 200 to select and execute a section dividing instruction (S3: Yes, and S5). As shown in FIG. 17A, the user operates the icon 200 to place a new dividing line 130C on the section 120B (S31, and S33: Yes). Thereby, as shown in FIG. 17B, the dividing line 130C is added onto the label image 100 (S131). By the dividing line 130C, the section 120B is divided into sections 120D and 120E. In response to this, the section information is updated (S133).

In the section 120B, the text object 112A is placed (S135: Yes). Therefore, the text object 112A is added into an upstream one (i.e., the section 120D) of the sections 120D and 120E in the label length direction, and the display size of the text object 112A is automatically adjusted (S137). Thereby, the user is allowed to freely divide a section 120 with an object 110 placed therein. Further, after the section 120 is divided, the layout of the object 110 is automatically adjusted in the placement target section. Therefore, it is possible to reduce a burden imposed on the user who operates the mobile terminal 20.

As described above, according to the illustrative embodiment, the mobile terminal 20 includes the touch panel 30 configured to display the label image 100. The label image 100 includes a plurality of sections 120 each of which includes one or more objects placed therein. Each object includes one or more characters or an image. The CPU 21 places an object 110 in a specified section 120 (S63). The CPU 21 sets a display attribute of the object for the specified section 120 (S68). Within each of the plurality of sections 120, the CPU 21 displays the object 110 placed in each section 120, based on the display attribute set for each section 120 (S49, S65, S69, S79, S81, S89, S113, and S137). Thereby, for each of the plurality of sections 120, the user is allowed to freely place the object 110 within each section 120 and freely set the display attribute of the object 110. Accordingly, it is possible to reduce a burden imposed on the user who operates the mobile terminal 20, and to place a plurality of objects 110 with an appropriate layout within the label image 100.

When a plurality of objects 110 are placed in a particular arrangement order in a section 120, the CPU 21 displays the plurality of objects 110 arranged in the particular arrangement order in an arrangement direction (e.g., the label length direction or the label width direction) within the section 120 (S49, S65, S69, S79, S81, S89, S113, and S137). When the arrangement order is changed, the CPU 21 displays the plurality of objects 110 arranged in the changed arrangement order in the arrangement direction within the section 120 (S71: Yes, S73: Yes, S75, S77: Yes, and S79). Thereby, the user is allowed to freely change the arrangement order for a plurality of objects 110 in each section 120.

The CPU changes a display size of a specified section 120 (S39, S47, S111, and S133). In accordance with the changed display size of the specified section 120, the CPU 21 changes a display size of each object 110 placed in the specified section 120 (S49, S113, and S137). Thereby, the user is allowed to freely change the display size of each section 120 and display, in an appropriate display size, each object 110 placed in each section of which the display size has been changed.

The CPU 21 moves an object 110 placed in a section 120 (a movement source section) into another section 120 (a movement destination section) (S71: Yes, S73: Yes, S75, and S77: Yes). When the object 110 is moved, the CPU 21 deletes the object 110 from the movement source section and displays the object 110 in the movement destination section (S79 and S81). Thereby, the user is allowed to freely move an object 110 between different sections 120.

The mobile terminal 20 includes the touch panel 30 configured to set a dividing line 130 on the label image 100 displayed thereon. The dividing line 130 divides the label image 100 into a plurality of areas. When the dividing line 130 is set on the touch panel 30, the CPU 21 sets, as a plurality of sections 120, the plurality of areas into which the label image 100 has been divided by the dividing line 130 (S37 and S39). Thereby, the user is allowed to freely set a plurality of sections 120 in the label image 100.

One or more objects 110 placed in the label image 100 may include a frame object 113. The frame object 113 is a frame-shaped image, and may include one or more other objects 110 placed therein. When a plurality of objects 110 including the frame object 113 are placed in a section 120, the CPU 21 displays the frame object 110 in the section 120, and displays the other objects 110 within the frame object 113 (S49, S65, S69, S79, S81, S89, S113, and S137). Thereby, the user is allowed to freely place, in each section 120, a frame object 113 in which one or more other objects 110 may be placed.

Suppose for instance that the label image 100 is divided by a dividing line 130 into a plurality of sections 120. When the label image 100 is enlarged or reduced in a particular direction, the CPU 21 may move the position of the dividing line 130 in the particular direction such that an enlargement/reduction ratio for each of the plurality of sections 120 in the particular direction becomes equal to an enlargement/reduction ratio for the label image 100 in the particular direction (S107 and S109). Thereby, the user is allowed to freely change the display size of the label image 100 without changing the layout of the dividing line 130.

Suppose for instance that the label image 100 is divided by a dividing line 130 into a plurality of sections 120. When the label image 100 is enlarged or reduced in a particular direction, the CPU 21 may maintain the position of the dividing line 130 regardless of the enlargement or reduction (S103 and S105). Thereby, the user is allowed to freely change the display size of the label image 100 without changing the set position of the dividing line 130.

The label image 100 is a quadrangular area extending in the mutually perpendicular directions (i.e., the vertical direction and the left-to-right direction). The label image 100 may be divided by at least one of a dividing line 130 extending in the vertical direction and a dividing line 130 extending in the left-to-right direction, into a plurality of quadrangular sections 120. Thus, each of the label image 100 and the plurality of sections 120 is formed in a quadrangular shape extending in the same mutually perpendicular directions. Hence, the user is allowed to divide the label image 100 into the plurality of sections 120 that are efficiently and closely placed within the label image 100.

The display attribute, set for a section 120 including therein objects 110 arranged in an arrangement direction, includes an alignment that represents which side of the upstream side, the center side, and the downstream side in the arrangement direction within the section 120, the objects 110 are to be placed on. Thereby, the user is allowed to set, for each section 120, an alignment of objects 110 placed therein.

The display attribute, set for a section 120 including therein objects 110 arranged in an arrangement direction, includes the arrangement direction. Thereby, the user is allowed to set, for each section 120, an arrangement direction of a plurality of objects 110 arranged in each section 120.

With respect to associations of elements exemplified in the illustrative embodiment with elements to be defined according to aspects of the present disclosure, the mobile terminal 20 may be an example of an image editor according to aspects of the present disclosure. The CPU 21 of the mobile terminal 20 may be an example of a controller of the image editor and an example of a processor according to aspects of the present disclosure. The label image 100 may be an example of an image editable area according to aspects of the present disclosure. The touch panel 30 may be an example of a display of the image editor according to aspects of the present disclosure.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the aforementioned illustrative embodiment, each of the label image 100, the objects 110, and the sections 120 is formed in a quadrangular shape. However, each of the label image 100, the objects 110, and the sections 120 may be formed in a round shape, a polygon shape, or a star shape. The dividing line 130 is not limited to a straight line. The dividing line 130 may be a curved line, a zigzag line, or a free line.

In the aforementioned illustrative embodiment, the display attribute is set for each section 120. However, the display attribute may be set for each object 110. In this case, in the automatic layout process, it is preferred that the display attribute for each object 110 has a higher priority than the display attribute for each section 120. For instance, the layout of an object 110 with no display attribute set therefor is automatically adjusted within a corresponding section 120 in accordance with a display attribute for the section 120. Meanwhile, the layout of an object 110 with a display attribute set therefor is automatically adjusted within a corresponding section 120 in accordance with the display attribute for the object 110.

In the aforementioned illustrative embodiment, the mobile terminal 20 performs the image edit process (see FIG. 3) based on the image edit application. However, a processor or a computer (e.g., a personal computer) having a user interface function may perform the image edit process. When the printer 10 has a user interface function, the printer 10 may perform the image edit process. An image edited in the image edit process is not limited to the label image 100, but may be an image used for a printed matter different from a label or may be an image for use application other than printing. The image edit process may be performed by the mobile terminal 20 alone, regardless of whether the mobile terminal 20 is connected with the printer 10.

What is claimed is:

1. An image editor comprising:
a display; and
a controller configured to:
display an image editable area on the display, wherein the image editable area is divided into a plurality of divided sections by a dividing line when the dividing line is set to the image editable area, and the image editable area corresponds to a single divided section when the dividing line is not set to the image editable area;
in response to receiving a line adding instruction to add a target dividing line onto a target section of one or more of the divided sections, determine whether there is an object within the target section;
in response to determining that there is an object within the target section, reject addition of the target dividing line onto the target section;
in response to determining that there is not an object within the target section, add the target dividing line onto the target section, thereby the target section being divided into a plurality of divided target sections by the target dividing line, and set a display attribute, which is set for the target section, for a specified section of the plurality of divided target sections; and
perform an image edit process for the specified section of the plurality of divided target sections, the image edit process comprising:

in response to receiving an object adding instruction to add an object to the specified section, placing the object in the specified section of the plurality of divided target sections;

setting a display attribute of the placed object, for the specified section based on the display attribute set to the specified section; and displaying the placed object within the specified section in accordance with the display attribute set for the specified section.

2. The image editor according to claim 1,
wherein the image edit process further comprises:
when a plurality of objects are placed in a particular arrangement order in the specified section which is one of the plurality of divided target sections, displaying the plurality of objects arranged in the particular arrangement order within the specified section, in accordance with the display attribute set for the specified section, the display attribute including:
an arrangement direction in which the plurality of objects are to be arranged within the specified section; and
an alignment representing which one of an upstream side, a center side, and a downstream side in the arrangement direction within the specified section, the plurality of objects are to be placed on; and
when the arrangement order is changed, displaying the plurality of objects arranged along the arrangement direction in the changed arrangement order within the specified section.

3. The image editor according to claim 1,
wherein the image edit process further comprises:
changing a display size of the specified section which is one of the plurality of divided target sections; and
changing a display size of the object displayed within the specified section, in accordance with the changed display size of the specified section.

4. The image editor according to claim 1,
wherein the image edit process further comprises:
moving the object placed in the specified section, which is one of the plurality of divided target sections, into one of an other section of the plurality of divided target sections and an other section of the plurality of divided sections;
deleting the object from the specified section; and
displaying the object within the other section.

5. The image editor according to claim 1,
wherein object includes a frame object, the frame object being a frame-shaped object configured to have one or more other objects placed therein, and
wherein the image edit process further comprises:
when a plurality of objects including the frame object are placed in the specified section which is one of the plurality of divided target sections, displaying the frame object within the specified section, and displaying one or more objects, other than the frame object, of the plurality of objects within the frame object.

6. The image editor according to claim 1,
wherein the image edit process further comprises:
when the image editable area is enlarged or reduced in a specific direction, moving a position of the dividing line in the specific direction in accordance with an enlargement/reduction ratio for the image editable area.

7. The image editor according to claim 1,
wherein the image edit process further comprises:
when the image editable area is enlarged or reduced in a specific direction, maintaining a position of the dividing line in the specific direction regardless of enlargement or reduction of the image editable area.

8. The image editor according to claim 1,
wherein the image editable area is a quadrangular area extending in a first direction and a second direction that are perpendicular to each other, and
wherein the plurality of divided target sections are a plurality of quadrangular areas.

9. A method implementable on a processor coupled with a display, the method comprising:
displaying an image editable area on the display, wherein the image editable area is divided into a plurality of divided sections by a dividing line when the dividing line is set to the image editable area, and the image editable area corresponds to a single divided section when the dividing line is not set to the image editable area;
in response to receiving a line adding instruction to add a target dividing line onto a target section of one or more of the divided sections, determining whether there is an object within the target section;
in response to determining that there is not an object within the target section, adding the target dividing line onto the target section, thereby the target section being divided into a plurality of divided target sections by the target dividing line, and set a display attribute, which is set for the target section, for a specified section of the plurality of divided target sections; and
performing an image edit process for the specified section of the plurality of divided target sections, the image edit process comprising:
in response to receiving an object adding instruction to add an object to the specified section, placing the object in the specified section of the plurality of divided target sections;
setting a display attribute of the placed object, for the specified section, based on the display attribute set to the specified section; and
displaying the placed object within the specified section in accordance with the display attribute set for the specified section.

10. The method of claim 9, further comprising:
displaying another image editable area on the display;
in response to receiving another instruction to add another target dividing line onto another target section of one or more of the divided sections, determining whether there is an object within the another target section; and
in response to determining that there is an object within the another target section, reject addition of the another target dividing line onto the another target section.

11. A non-transitory computer-readable medium storing computer-readable instructions that are executable by a processor coupled with a display, the instructions being configured to, when executed by the processor, cause the processor to:
display an image editable area on the display, wherein the image editable area is divided into a plurality of divided sections by a dividing line when the dividing line is set to the image editable area, and the image editable area corresponds to a single divided section when the dividing line is not set to the image editable area;
in response to receiving a line adding instruction to add a target dividing line onto a target section of one or more of the divided sections, determine whether there is an object within the target section;

in response to determining that there is an object within the target section, reject addition of the target dividing line onto the target section;

in response to determining that there is not an object within the target section, add the target dividing line onto the target section, thereby the target section being divided into a plurality of divided target sections by the target dividing line, and set a display attribute, which is set for the target section, for a specified section of the plurality of divided target sections; and perform an image edit process for the specified section of the plurality of divided target sections, the image edit process comprising:

in response to receiving an object adding instruction to add an object to the specified section, placing the object in the specified section of the plurality of divided target sections;

setting a display attribute of the placed object, for the specified section, based on the display attribute set to the specified section; and displaying the placed object within the specified section in accordance with the display attribute set for the specified section.

12. The non-transitory computer-readable medium according to claim 11,
wherein the image edit process further comprises:
when a plurality of objects are placed in a particular arrangement order in the specified section which is one of the plurality of divided target sections, displaying the plurality of objects arranged in the particular arrangement order within the specified section, in accordance with the display attribute set for the specified section, the display attribute including:
an arrangement direction in which the plurality of objects are to be arranged within the specified section; and
an alignment representing which one of an upstream side, a center side, and a downstream side in the arrangement direction within the specified section, the plurality of objects are to be placed on; and
when the arrangement order is changed, displaying the plurality of objects arranged along the arrangement direction in the changed arrangement order within the specified section.

13. The non-transitory computer-readable medium according to claim 11,
wherein the image edit process further comprises:
changing a display size of the specified section which is one of the plurality of divided target sections; and
changing a display size of the object displayed within the specified section, in accordance with the changed display size of the specified section.

14. The non-transitory computer-readable medium according to claim 11,
wherein the image edit process further comprises:
moving the object placed in the specified section, which is one of the plurality of divided target sections, into one of an other section of the plurality of divided target sections and an other section of the plurality of divided sections;
deleting the object from the specified section; and
displaying the object within the other section.

15. The non-transitory computer-readable medium according to claim 11,
wherein the object includes a frame object, the frame object being a frame-shaped object configured to have one or more other objects placed therein,
wherein the image edit process further comprises:
when a plurality of objects including the frame object are placed in the specified section which is one of the plurality of divided target sections, displaying the frame object within the specified section, and displaying one or more objects, other than the frame object, of the plurality of objects within the frame object.

16. The non-transitory computer-readable medium according to claim 11,
wherein the image edit process further comprises:
when the image editable area is enlarged or reduced in a specific direction, moving a position of the dividing line in the specific direction in accordance with an enlargement/reduction ratio for the image editable area.

17. The non-transitory computer-readable medium according to claim 11,
wherein the image edit process further comprises:
when the image editable area is enlarged or reduced in a specific direction, maintaining a position of the dividing line in the specific direction regardless of enlargement or reduction of the image editable area.

18. The non-transitory computer-readable medium according to claim 11,
wherein the image editable area is a quadrangular area extending in a first direction and a second direction that are perpendicular to each other, and
wherein the plurality of divided target sections are a plurality of quadrangular areas.

19. An image editor comprising:
a display; and
a controller configured to:
display an image editable area on the display, wherein the image editable area is divided into a plurality of divided sections by a dividing line when the dividing line is set to the image editable area, and the image editable area corresponds to a single divided section when the dividing line is not set to the image editable area;
display an operable image on the display, the operable image being operable by a user;
in response to an additional dividing line is placed on the image editable area by the operable image being operated, determine that a line adding instruction to add the additional dividing line is received, wherein a target section is one of one or more of the divided sections, and the target section is a section traversed by the additional dividing line,
in response to determining that there is an object within the target section, reject addition of the additional dividing line onto the target section, and delete the additional dividing line placed on the image editable area;
in response to determining that there is not an object within the target section, add the additional dividing line onto the target section, thereby the target section being divided into a plurality of divided target sections by the additional dividing line, and set a display attribute, which is set for the target section, for a specified section of the plurality of divided target sections; and
perform an image edit process for the specified section of the plurality of divided target sections, the image edit process comprising:
in response to receiving an object adding instruction to add an object to the specified section, placing the object in the specified section of the plurality of divided target sections;
setting a display attribute of the placed object, for the specified section, based on the display attribute set to the specified section; and
displaying the placed object within the specified section in accordance with the display attribute set for the specified section.

\* \* \* \* \*

UNITED STATES PATENT AND TRADEMARK OFFICE
CERTIFICATE OF CORRECTION

PATENT NO. : 10,289,366 B2
APPLICATION NO. : 15/450096
DATED : May 14, 2019
INVENTOR(S) : Takashi Nishizaki Page 1 of 1

It is certified that error appears in the above-identified patent and that said Letters Patent is hereby corrected as shown below:

In the Claims

Column 21, Claim 1, Line 6:
Please delete "specified section based" and insert --specified section, based--

Signed and Sealed this
Sixth Day of August, 2019

Andrei Iancu
*Director of the United States Patent and Trademark Office*